United States Patent
Karaki et al.

(10) Patent No.: US 12,022,462 B2
(45) Date of Patent: Jun. 25, 2024

(54) UPLINK SCHEDULING GRANT FOR A PLURALITY OF PHYSICAL UPLINK SHARED CHANNELS

(71) Applicant: Telefonaktiebolaget LM Ericsson (PUBL), Stockholm (SE)

(72) Inventors: Reem Karaki, Aachen (DE); Jung-Fu Cheng, Fremont, CA (US); Tai Do, Lund (SE); Stephen Grant, Pleasanton, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 561 days.

(21) Appl. No.: 17/267,278

(22) PCT Filed: Aug. 2, 2019

(86) PCT No.: PCT/EP2019/070916
§ 371 (c)(1),
(2) Date: Feb. 9, 2021

(87) PCT Pub. No.: WO2020/030555
PCT Pub. Date: Feb. 13, 2020

(65) Prior Publication Data
US 2021/0314983 A1    Oct. 7, 2021

Related U.S. Application Data

(60) Provisional application No. 62/717,030, filed on Aug. 10, 2018.

(51) Int. Cl.
*H04W 72/1268* (2023.01)
*H04W 72/0446* (2023.01)
*H04W 72/23* (2023.01)

(52) U.S. Cl.
CPC ... *H04W 72/1268* (2013.01); *H04W 72/0446* (2013.01); *H04W 72/23* (2023.01)

(58) Field of Classification Search
CPC ... H04L 5/0044; H04L 5/0053; H04L 5/0094; H04L 5/00
See application file for complete search history.

(56) References Cited

U.S. PATENT DOCUMENTS

| | | | | |
|---|---|---|---|---|
| 2017/0289869 | A1* | 10/2017 | Nogami | H04L 5/0094 |
| 2019/0149365 | A1* | 5/2019 | Chatterjee | H04L 25/0226 370/329 |

(Continued)

FOREIGN PATENT DOCUMENTS

| | | |
|---|---|---|
| EP | 3282627 A1 | 2/2018 |
| EP | 3334234 A1 | 6/2018 |

OTHER PUBLICATIONS

"On scheduled PUSCH (& PDSCH) repetition enhancements for NR URLLC"; 3GPP TSG RAN WG1 Meeting #94 R1-1808576 Gothenburg, Sweden, Aug. 20-24, 2018; Nokia (Year: 2018).*

(Continued)

*Primary Examiner* — Benjamin H Elliott, IV
(74) *Attorney, Agent, or Firm* — Baker Botts L.L.P.

(57) ABSTRACT

A method performed by a wireless device 410 is provided for receiving an uplink scheduling grant for a plurality of physical uplink shared channels (PUSCHs). The method includes receiving, from a network node 460, downlink control information (DCI). The DCI includes an indication corresponding to at least a time domain resource for each of the plurality of PUSCHs. Based on the indication, uplink scheduling grant resources are determined for the plurality of PUSCHs. At least one transmission is sent according to the determined uplink scheduling grant resources.

11 Claims, 18 Drawing Sheets

(56) References Cited

U.S. PATENT DOCUMENTS

2020/0053710 A1* 2/2020 MolavianJazi ....... H04W 72/21
2020/0404658 A1* 12/2020 Lin ...................... H04W 72/04
2021/0144700 A1* 5/2021 Lee ...................... H04L 5/0053
2021/0314983 A1* 10/2021 Karaki .................. H04L 5/0044

OTHER PUBLICATIONS

3GPP TSG RAN WG2 NR #103 Meeting; Gothenburg, Sweden; Source: ZTE; Title: Impacts on MAC for NR-U operation (R2-1811282)—Aug. 20-24, 2018.

PCT Notification of Transmittal of the International Search Report and the Written Opinion of the International Searching Authority, or the Declaration issued for International application No. PCT/EP2019/070916 dated Oct. 17, 2019.

Extended European Search Report issued for Application No. / Patent No. 23169908.3-1213 / 4243320—dated Oct. 9, 2023.

* cited by examiner

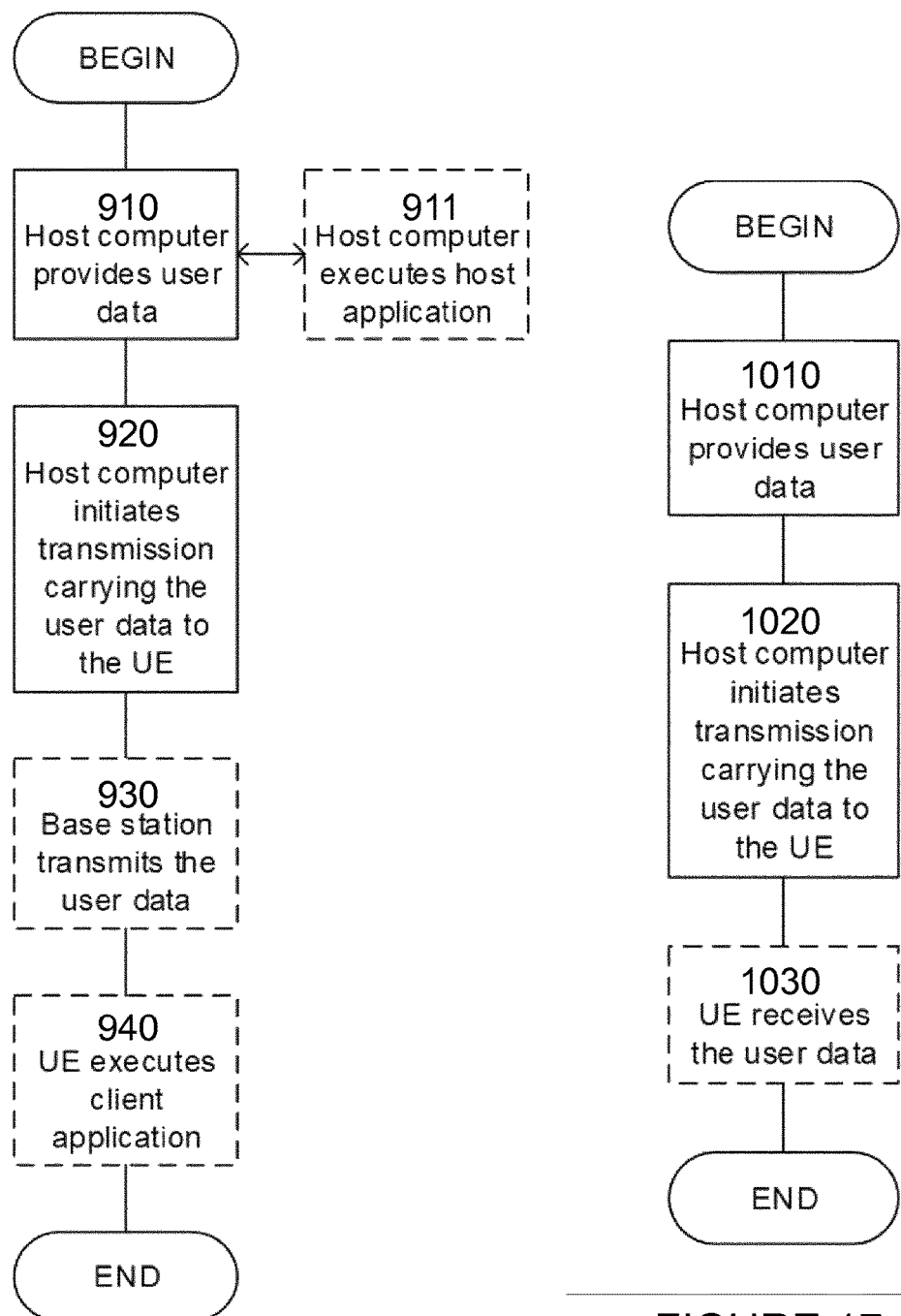

UPLINK SCHEDULING GRANT FOR A PLURALITY OF PHYSICAL UPLINK SHARED CHANNELS

PRIORITY

This nonprovisional application is a U.S. National Stage Filing under 35 U.S.C. § 371 of International Patent Application Serial No. PCT/EP2019/070916 filed Aug. 2, 2019 and entitled "UPLINK SCHEDULING GRANT FOR A PLURALITY OF PHYSICAL UPLINK SHARED CHANNELS" which claims priority to U.S. Provisional Patent Application No. 62/717,030 filed Aug. 10, 2018 both of which are hereby incorporated by reference in their entirety.

BACKGROUND

New radio (NR) standard in 3GPP is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR, in addition to transmission in a slot, a mini-slot transmission is also allowed to reduce latency. A mini-slot may consist of any number of 1 to 14 OFDM symbols. It should be noted that the concepts of slot and mini-slot are not specific to a specific service meaning that a mini-slot may be used for eMBB, URLLC, or other services. FIG. 1 illustrates an example radio resource in NR.

In Rel-15 NR, a user equipment (UE) can be configured with up to four carrier bandwidth parts in the downlink with a single downlink carrier bandwidth part being active at a given time. A UE can be configured with up to four carrier bandwidth parts in the uplink with a single uplink carrier bandwidth part being active at a given time. If a UE is configured with a supplementary uplink, the UE can in addition be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N_{BWP,i}^{size}-1$, where i is the index of the carrier bandwidth part. A resource block (RB) is defined as 12 consecutive subcarriers in the frequency domain.

Multiple Orthogonal Frequency Division Multiplexing (OFDM) numerologies, $\mu$, are supported in NR as given by Table 1, where the subcarrier spacing, $\Delta f$, and the cyclic prefix for a carrier bandwidth part are configured by different higher layer parameters for downlink and uplink, respectively.

TABLE 1

| Supported transmission numerologies. | | |
| --- | --- | --- |
| $\mu$ | $\Delta f = 2^\mu \cdot 15$ [KHz] | Cyclic prefix |
| 0 | 15 | Normal |
| 1 | 30 | Normal |
| 2 | 60 | Normal, Extended |
| 3 | 120 | Normal |
| 4 | 240 | Normal |

A downlink physical channel corresponds to a set of resource elements carrying information originating from higher layers. The following downlink physical channels are defined:
  Physical Downlink Shared Channel (PDSCH)
  Physical Broadcast Channel (PBCH)
  Physical Downlink Control Channel (PDCCH)
  PDSCH is the main physical channel used for unicast downlink data transmission, but also for transmission of random access response (RAR), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. The following uplink physical channels are defined:
  Physical Uplink Shared Channel (PUSCH)
  Physical Uplink Control Channel (PUCCH)
  Physical Random Access Channel (PRACH)
  PUSCH is the uplink counterpart to the PDSCH. PUCCH is used by UEs to transmit uplink control information, including Hybrid Automatic Repeat Request (HARQ) acknowledgements, channel state information reports, etc. PRACH is used for random access preamble transmission.

In general, a UE shall determine the resource block (RB) assignment in frequency domain for PUSCH or PDSCH using the resource allocation field in the detected DCI carried in PDCCH. For PUSCH carrying msg3 in a random-access procedure, the frequency domain resource assignment is signaled by using the uplink (UL) grant contained in RAR.

SUMMARY

Certain aspects of the present disclosure and their embodiments may provide solutions to these or other challenges. For example, according to certain embodiments, a method is provided for reducing Physical Downlink Control Channel (PDCCH) overhead by enabling multi slot and mini-slot scheduling.

According to certain embodiments, a method performed by a wireless device is provided for receiving an uplink scheduling grant for a plurality of physical uplink shared channels (PUSCHs). The method includes receiving, from a network node, downlink control information (DCI). The DCI includes an indication corresponding to at least a time domain resource for each of the plurality of PUSCHs. Based on the indication, uplink scheduling grant resources are determined for the plurality of PUSCHs. At least one transmission is sent according to the determined uplink scheduling grant resources.

According to certain embodiments, a wireless device is provided for receiving an uplink scheduling grant for a plurality of PUSCHs. The wireless device includes memory operable to store instructions and processing circuitry operable to execute the instructions to cause the wireless device to receive DCI from a network node. The DCI includes an indication corresponding to at least a time domain resource for each of the plurality of PUSCHs. Based on the indication, uplink scheduling grant resources are determined for the plurality of PUSCHs. At least one transmission is sent according to the determined uplink scheduling grant resources.

According to certain embodiments, a method performed by a network node for scheduling a wireless device for transmission in a plurality of PUSCHs includes transmitting, to the wireless device, an uplink grant comprising DCI indicating at least time resources for each of the plurality of PUSCHs. Based on the uplink grant, at least one transmission is received in the time resources indicated for the plurality of PUSCHs.

According to certain embodiments, a network node is provided for scheduling a wireless device for transmission in a plurality of PUSCHs. The network node includes memory operable to store instructions and processing circuitry operable to execute the instructions to cause the network node to transmit, to the wireless device, an uplink grant comprising DCI indicating at least time resources for each of the plurality of PUSCHs. Based on the uplink grant, at least one transmission is received in the time resources indicated for the plurality of PUSCHs.

According to certain embodiments a computer program is provided. The computer program comprising instructions which when executed on a computer perform any of the aforementioned methods.

According to certain embodiments a computer program product is provided. The computer program product comprising a computer program, the computer program comprising instructions which when executed on a computer perform any of the aforementioned methods.

According to certain embodiments a non-transitory computer readable medium is provided. The computer readable storage medium storing instructions which when executed by a computer perform any of the aforementioned methods.

Certain embodiments may provide one or more of the following technical advantages. For example, one technical advantage may be that certain embodiments reduce overhead on PDCCH by sending scheduling information for multiple slots using one grant. As another example, a technical advantage may be that certain embodiments enable efficient UL scheduling and transmission when multiple starting/ending positions is supported.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 16 illustrates a method implemented in a communication system, according to one embodiment;

FIG. 17 illustrates another method implemented in a communication system, according to one embodiment;

DETAILED DESCRIPTION

Figure 1:
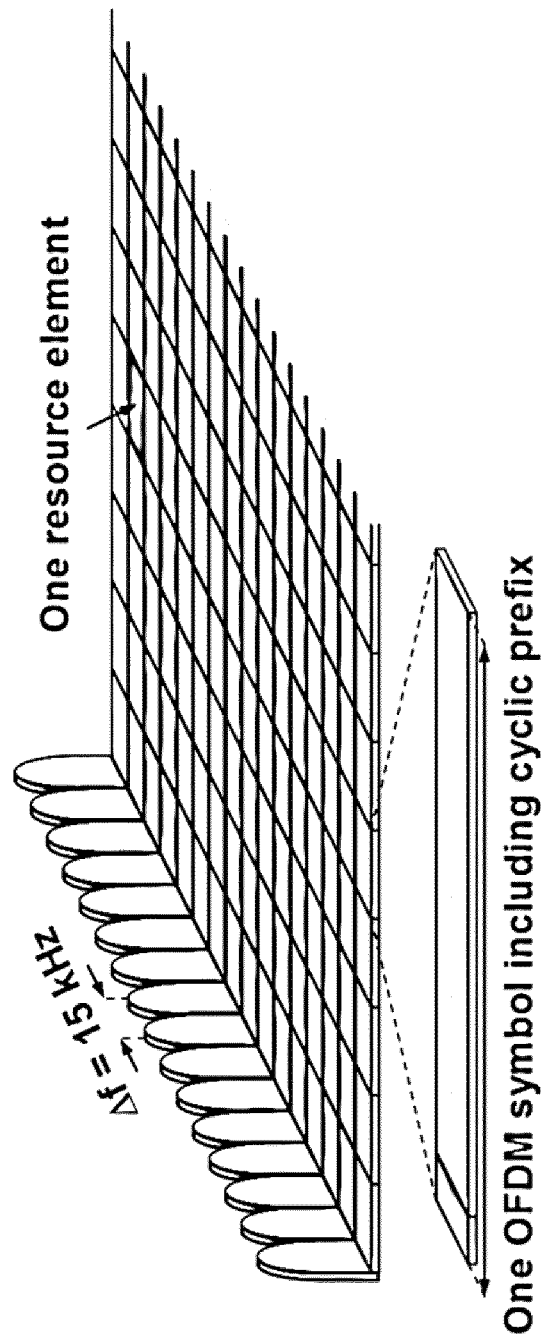
FIG. 1 illustrates an example radio resource in NR.

The present application considers scheduling control procedures to improve signaling efficiency. For example, NR allows scheduling multiple slots each with a separate UL grant. This can easily exhaust PDCCH resources when the scheduled UL bursts are long and/or the number of UEs to be scheduled is high. The latter, adds restrictions to the scheduling procedures, and unnecessarily wastes PDCCH resources.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. According to certain embodiments, Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, eNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

In NR, two frequency resource allocation schemes, type 0 and type 1, are supported for PUSCH and PDSCH. Which type to use for a PUSCH/PDSCH transmission is either defined by a Radio Resource Control (RRC) configured parameter or indicated directly in the corresponding DCI or UL grant in RAR (for which type 1 is used).

The RB indexing for uplink/downlink type 0 and type 1 resource allocation is determined within the UE's active carrier bandwidth part, and the UE shall, upon detection of PDCCH intended for the UE, determine first the uplink/downlink carrier bandwidth part and then the resource allocation within the carrier bandwidth part (BWP). The UL BWP for PUSCH carrying msg3 is configured by higher layer parameters.

When the UE is scheduled to transmit a transport block, the Time domain resource assignment field value m of the DCI provides a row index m+1 to an allocated RRC configured table. The indexed row defines:
 the slot offset $K_2$,
 the start and length indicator (SLIV), or directly the start symbol S and the allocation length L,
 the PUSCH mapping type to be applied in the PUSCH transmission.

The slot where the UE shall transmit the PUSCH is determined by K2 as $$\left\lfloor n \cdot \frac{2^{\mu_{PUSCH}}}{2^{\mu_{PDCCH}}} \right\rfloor + K_2$$

where n is the slot with the scheduling DCI, K2 is based on the numerology of PUSCH, and $\mu_{PUSCH}$ and $\mu_{PDCCH}$ are the subcarrier spacing configurations for PUSCH and PDCCH, respectively.

The starting symbol S relative to the start of the slot, and the number of consecutive symbols L counting from the symbol S allocated for the PUSCH are determined from the start and length indicator SLIV of the indexed row:
 if $(L-7) \le 7$ then
  SLIV=14·(L−1)+S
 Else
  SLIV=14·(14−L+1)+(14−1−S)
 Where
  0<L≤14−S The UE shall consider the S and L combinations defined in Table 2 as valid PUSCH allocations.

TABLE 2

| PUSCH mapping type | Valid S and L combinations | | | | | |
|---|---|---|---|---|---|---|
| | Normal cyclic prefix | | | Extended cyclic prefix | | |
| | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 12} | {1, ..., 12} | {1, ..., 12} |

Either a default PUSCH time domain allocation A according to Table 3, is applied, or the higher layer configured pusch-AllocationList in either pusch-ConfigCommon or pusch-Config is applied. j depends on the subcarrier spacing and is defined in Table 4.

TABLE 3

Default PUSCH time domain resource allocation A for extended CP

| Row index | PUSCH mapping type | $K_2$ | S | L |
|---|---|---|---|---|
| 1 | Type A | j | 0 | 8 |
| 2 | Type A | j | 0 | 12 |
| 3 | Type A | j | 0 | 10 |
| 4 | Type B | j | 2 | 10 |
| 5 | Type B | j | 4 | 4 |
| 6 | Type B | j | 4 | 8 |
| 7 | Type B | j | 4 | 6 |
| 8 | Type A | j + 1 | 0 | 8 |
| 9 | Type A | j + 1 | 0 | 12 |
| 10 | Type A | j + 1 | 0 | 10 |
| 11 | Type A | j + 2 | 0 | 6 |
| 12 | Type A | j + 2 | 0 | 12 |
| 13 | Type A | j + 2 | 0 | 10 |
| 14 | Type B | j | 8 | 4 |
| 15 | Type A | j + 3 | 0 | 8 |
| 16 | Type A | j + 3 | 0 | 10 |

TABLE 4

Definition of value j

| $\mu_{PUSCH}$ | j |
|---|---|
| 0 | 1 |
| 1 | 1 |
| 2 | 2 |
| 3 | 3 |

To determine the modulation order, target code rate, redundancy version and transport block size for the physical uplink shared channel, the UE shall first read the 5-bit modulation and coding scheme field ($I_{MCS}$) in the DCI to determine the modulation order ($O_m$) and target code rate (R)

read redundancy version field (rv) in the DCI to determine the redundancy version, and

[check the "CSI request" bit field]

and second the UE shall use the number of layers (v), the total number of allocated PRBs ($n_{PRB}$) to determine the transport block size In 3GPP NR standard, downlink control information is received over the PDCCH. The PDCCH may carry DCI in messages with different formats. DCI format 0_0 and 0_1 are DCI messages used to convey uplink grants to the UE for transmission of the physical layer data channel in the uplink (PUSCH) and DCI format 1_0 and 1_1 are used to convey downlink grants for transmission of the physical layer data channel on the downlink (PDSCH). Other DCI formats (2_0, 2_1, 2_2 and 2_3) are used for other purposes such as transmission of slot format information, reserved resource, transmit power control information etc.

Figure 2:
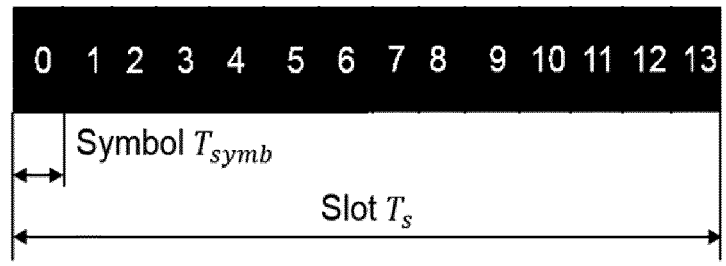
FIG. 2 illustrates a subframe with 14 OFDM symbols.

An NR slot consists of several OFDM symbols, according to current agreements either 7 or 14 symbols (OFDM subcarrier spacing ≤60 kHz) and 14 symbols (OFDM subcarrier spacing >60 kHz). FIG. 2 shows a subframe with 14 OFDM symbols. In FIG. 2 $T_s$ and $T_{symb}$ denote the slot and OFDM symbol duration, respectively.

Figure 3:
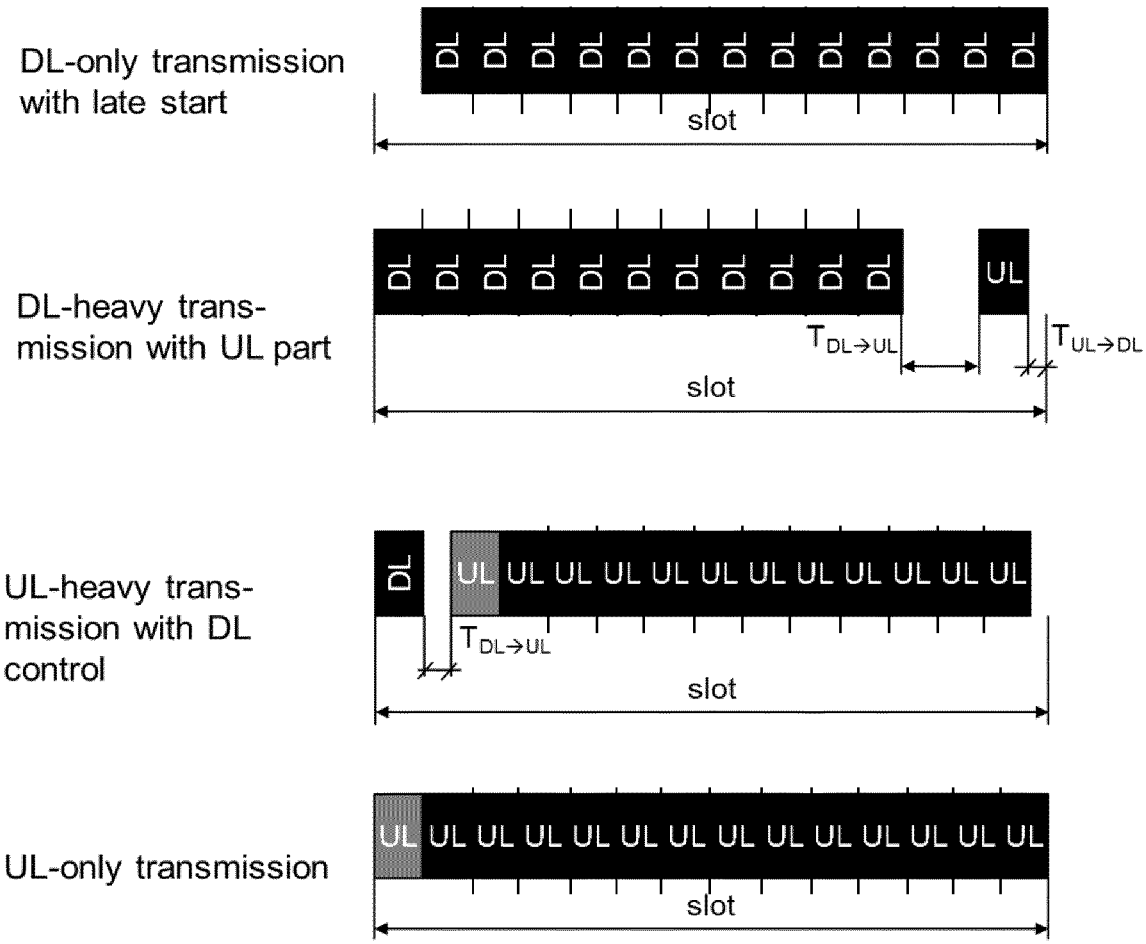
FIG. 3 illustrates potential variations of a slot that is shortened to accommodate DL/UL transient period or both DL and UL transmissions.

In addition, a slot may also be shortened to accommodate DL/UL transient period or both DL and UL transmissions. Potential variations are shown in FIG. 3.

Figure 4:
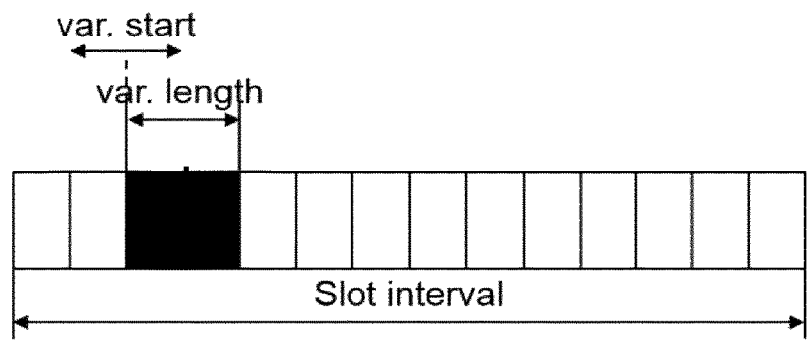
FIG. 4 illustrates an example of mini-slots.

Furthermore, NR also defines Type B scheduling, also known as mini-slots. Mini-slots are shorter than slots (according to current agreements from 1 or 2 symbols up to number of symbols in a slot minus one) and can start at any symbol. Mini-slots are used if the transmission duration of a slot is too long or the occurrence of the next slot start (slot alignment) is too late. Applications of mini-slots include among others latency critical transmissions (in this case both mini-slot length and frequent opportunity of mini-slot are important) and unlicensed spectrum where a transmission should start immediately after listen-before-talk succeeded (here the frequent opportunity of mini-slot is especially important). An example of mini-slots is shown in FIG. 4.

For a node to be allowed to transmit in unlicensed spectrum, e.g. the 5 GHz band, it typically needs to perform a clear channel assessment (CCA). This procedure typically includes sensing the medium to be idle for a number of time intervals. Sensing the medium to be idle can be done in different ways, e.g. using energy detection, preamble detection or using virtual carrier sensing. Where the latter implies that the node reads control information from other transmitting nodes informing when a transmission ends. After sensing the medium idle a node is typically allowed to transmit for a certain amount of time, sometimes referred to as transmission opportunity (TXOP). The length of the TXOP depends on regulation and type of CCA that has been performed, but typically ranges from 1 ms to 10 ms.

The mini-slot concept in NR allows a node to access the channel at a much finer granularity compared to e.g. LTE LAA, where the channel could only be accessed at 500 us intervals. Using for example 60 kHz subcarrier-spacing and a two symbol mini-slot in NR, the channel can be accessed at 36 us intervals.

PUSCH Time Resources for Multi-Slot Scheduling

According to certain embodiments, LAA multi-subframe scheduling should be the baseline to enable scheduling multiple transmission time intervals (TTIs) for PUSCH using a single UL grant in NR. To support multi-slot scheduling for NR, the DCI should include, implicitly or explicitly, at least:

Number of consecutively scheduled slots

New Data Indicator (NDI) per scheduled HARQ ID

Redundancy Value (RV) per scheduled HARQ ID

Unlike LAA, PUSCH duration in NR could be any variable number between {2 and 14}. To indicate time resources per slot in a multi-slot grant, one or combination of the following three alternative embodiments can be used.

Figure 5A:
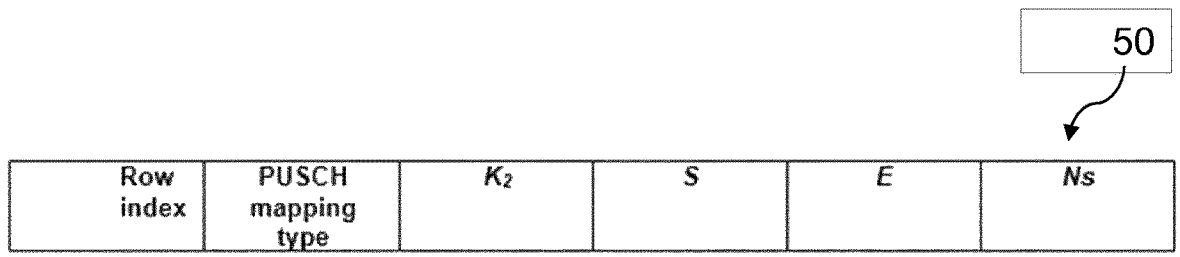
FIG. 5A illustrates one example configuration of an RRC configured table, according to certain embodiments.

According to a first embodiment, when the UE is scheduled using a multi-slot DCI grant, the Time domain resource assignment field value m of the DCI provides a row index m+1 to an allocated RRC configured table. FIG. 5A illustrates one example configuration of an RRC configured table 50, wherein the indexed row defines:

the slot offset $K_2$,

The start symbol S of the 1$^{st}$ slot of the scheduled UL burst

The end symbol E of the last slot of the scheduled UL burst the PUSCH mapping type to be applied in the PUSCH transmission.

Number of scheduled slots (Ns)

Figure 5B:
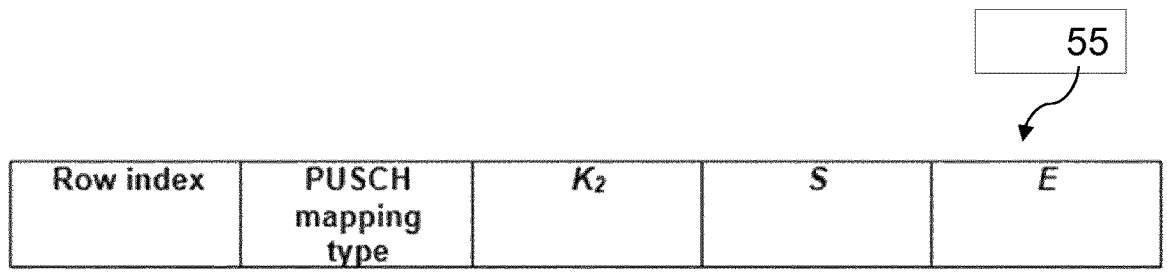
FIG. 5B illustrates another example configuration of an RRC configured table, according to certain embodiments.

According to a second embodiment, when the UE is scheduled using a multi-slot DCI grant, the Time domain resource assignment field value m of the DCI provides a row index m+1 to an allocated RRC configured table. FIG. 5B illustrates another example configuration of an RRC configured table 55, wherein the indexed row defines:

the slot offset $K_2$,

The start symbol S of the 1$^{st}$ slot of the scheduled UL burst

The end symbol E of the last slot of the scheduled UL burst the PUSCH mapping type to be applied in the PUSCH transmission.

The number of scheduled slots is indicated using a separate field in DCI.

According to a third embodiment, The existing RRC configured table for PUSCH allocation List with (K2, S and L) is reused but with different interpretation:

Starting symbol is applicable to the first scheduled slot in the UL burst. The ending symbol of the first scheduled slot is #13.

The starting symbol of the last scheduled slots is #0 and PUSCH length is L.

The slots in between first and last slot in the scheduled burst start and end at #0 and #13 respectively.

The number of scheduled slots is indicated using a separate field in DCI.

PUSCH Time Resources for Multi-Mini-Slot Scheduling within a Slot

According to certain embodiments, Multi-mini slot scheduling has two main advantages:

Increase the access granularity

Reduce the overhead over PDCCH by scheduling multiple mini-slots using one grant.

The maximum number of mini-slots that can be scheduled using DCI for multi-mini-slot scheduling should be configured over RRC. Besides, multi-mini-slot scheduling should be limited to scheduling mini-slots within the maximum X slot(s).

To support multi-mini-slot scheduling for NR, the DCI should include, implicitly or explicitly, at least:

NDI per scheduled HARQ ID

RV per scheduled HARQ ID

Number of consecutively scheduled mini-slots

To indicate the Time resources the following fourth, fifth alternative embodiments are possible.

Figure 6:
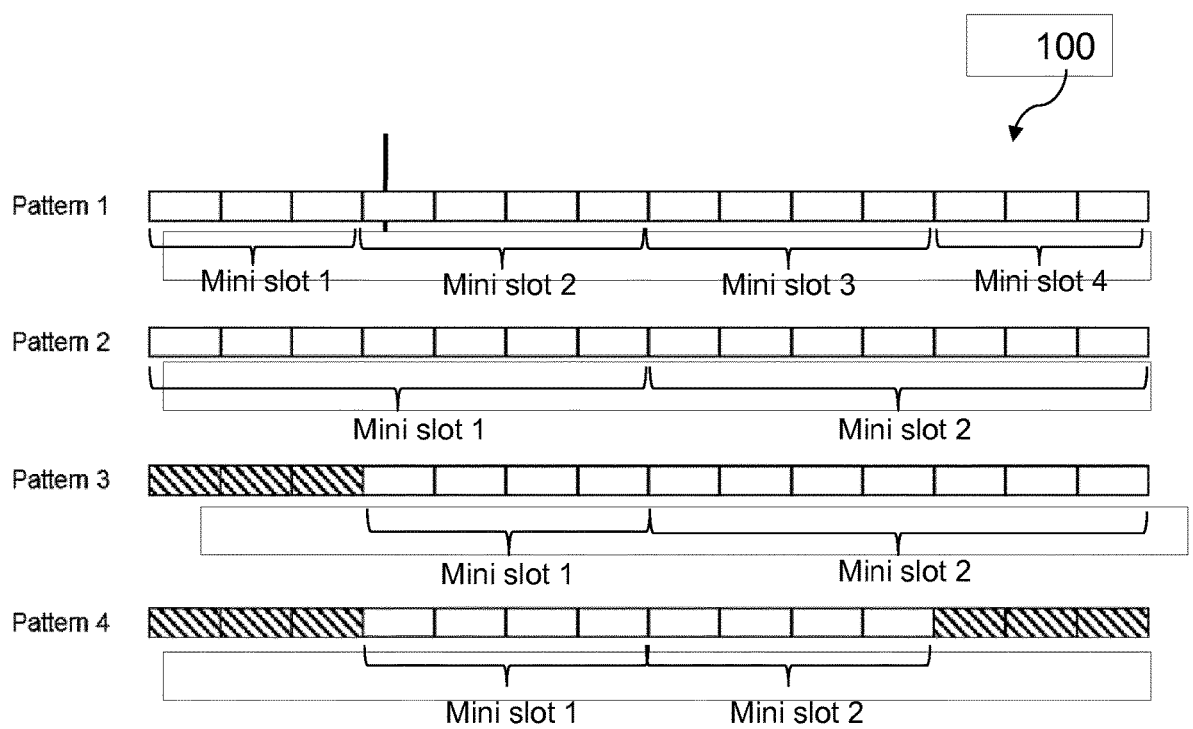
FIG. 6 illustrates example mini-slot patterns configured via RRC, according to certain embodiments.

According to a fourth embodiment, one or multiple mini-slot patterns 100 are configured via RRC, see FIG. 6. The Pattern 100 indicates the start and end of every PUSCH.

Alternatively, mini-slot periodicity is configured via RRC, which is equivalent to setting a mini-slot pattern with consecutive equal length PUSCH (e.g. mini slot periodicity is 7 symbols in Pattern 2 in FIG. 6).

If more than 1 pattern is configured, DCI provides an index to the pattern to be used for UL transmission(s) within a slot.

To indicate the start and end symbol within the scheduled slot, the timeDomainAllocation indicated in DCI can be reused to indicate:

the slot offset $K_2$, the start and length indicator SLIV, or directly the start symbol S and the allocation length L If the last mini-slot is partially within the indicated length L, the UE recalculate the length of the last mini-slot considering that the transmission would be terminated at symbol (S+L).

Alternatively, DCI indicates implicitly or explicitly at which mini slot within the pattern the transmission should start and end.

Figure 7:
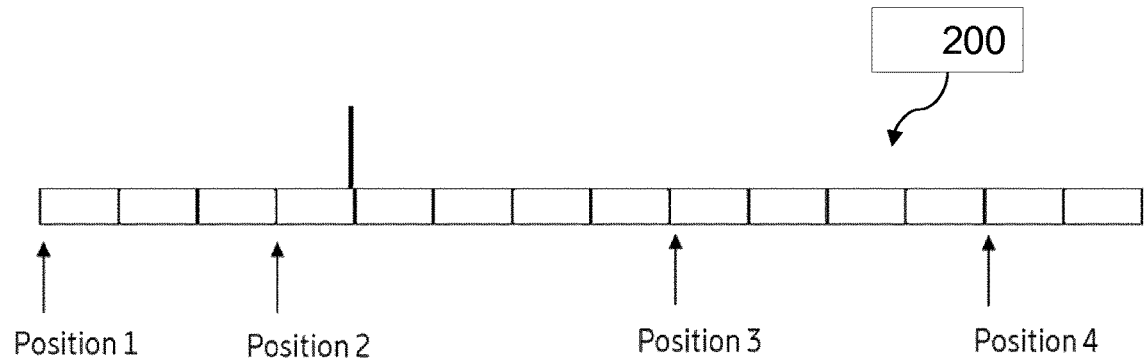
FIG. 7 illustrates example PUSCH starting positions configured via RRC, according to certain embodiments.

According to a fifth embodiment, one or multiple PUSCH starting positions 200 are configured via RRC, see FIG. 7.

The PUSCH starting positions can be enabled/disabled dynamically in a multi-mini slot DCI. According to the enabled positions, the mini-slot(s) duration vary. A certain mini slot expands from a PUSCH starting position to the next enabled PUSCH starting position.

Figure 8:
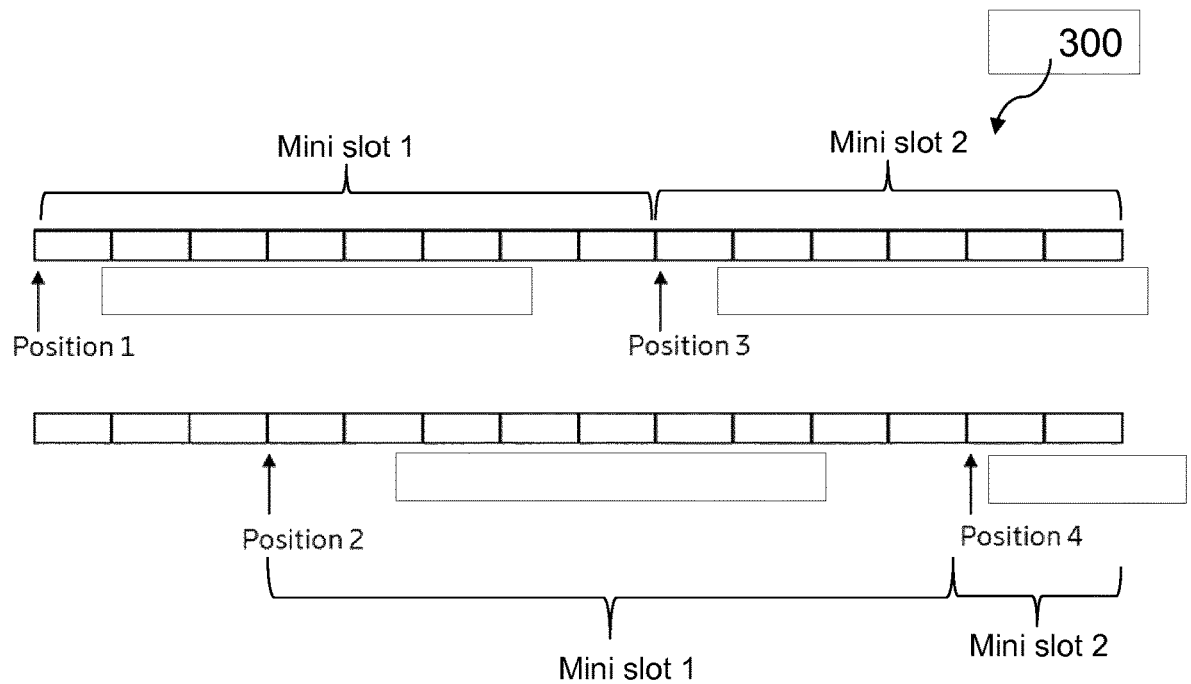
FIG. 8 illustrates an example of how the mini-slot pattern may dynamically change depending on the enabled position via DCI, according to certain embodiments.

Assuming the starting positions shown in FIG. 7, FIG. 8 shows an example of how the mini-slot pattern 300 may dynamically change depending on the enabled position via DCI. Upper figure, position 1 and 3 enabled. Lower figure, position 2 and 4 enabled.

In the previous examples, and as further described below, the DCI provides an indication corresponding to time resources, e.g. slot/mini-slot timing, which corresponds to a plurality of PUSCH transmissions. Thus, the DCI provides uplink scheduling for the plurality of PUSCH in an efficient manner.

With regard to MCS selection, if a retransmission PUSCH is scheduled on a time resource different that the initial transmission, the UE does not refer to the MCS value indicated by the DCI, but instead assumes the same TBS as in the initial transmission and rate match it to fit in the scheduled PUSCH.

Figure 9:
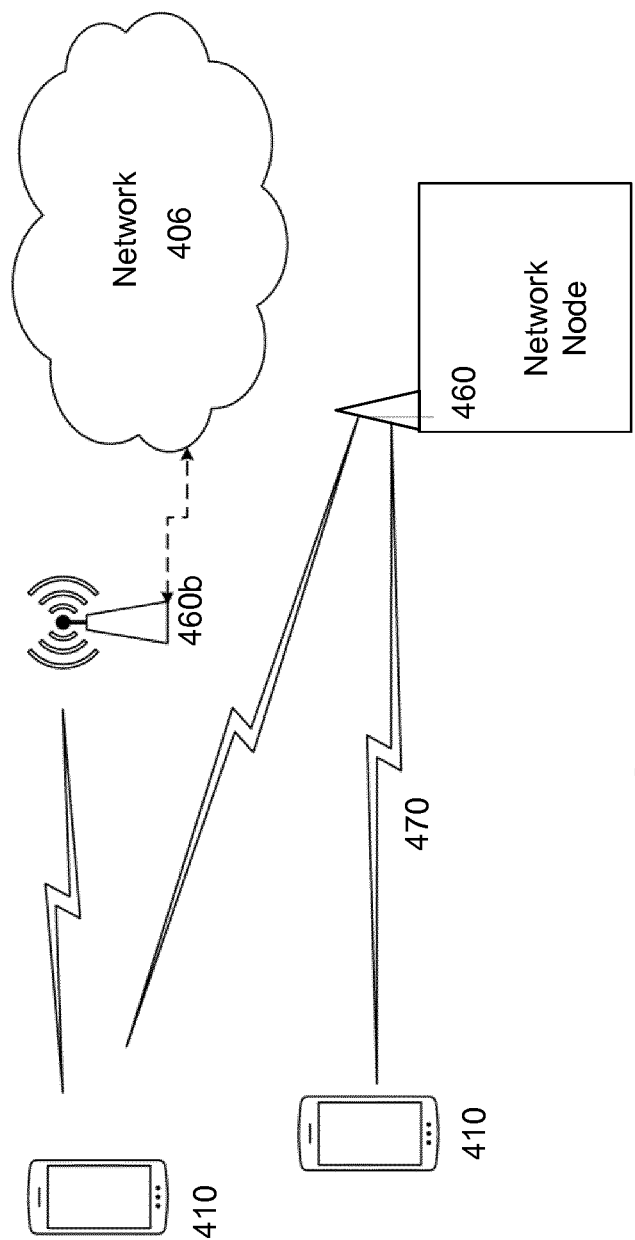
FIG. 9 illustrates an example wireless network according to certain embodiments.

FIG. 9 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 406, network nodes 460 and 460*b*, and wireless devices 410, 410*b*, and 410*c*. In practice, a wireless network may further include any additional elements suitable to support communication between wireless devices or between a wireless device and another communication device, such as a landline telephone, a service provider, or any other network node or end device. Of the illustrated components, network node 460 and wireless device 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and wireless device 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 10:
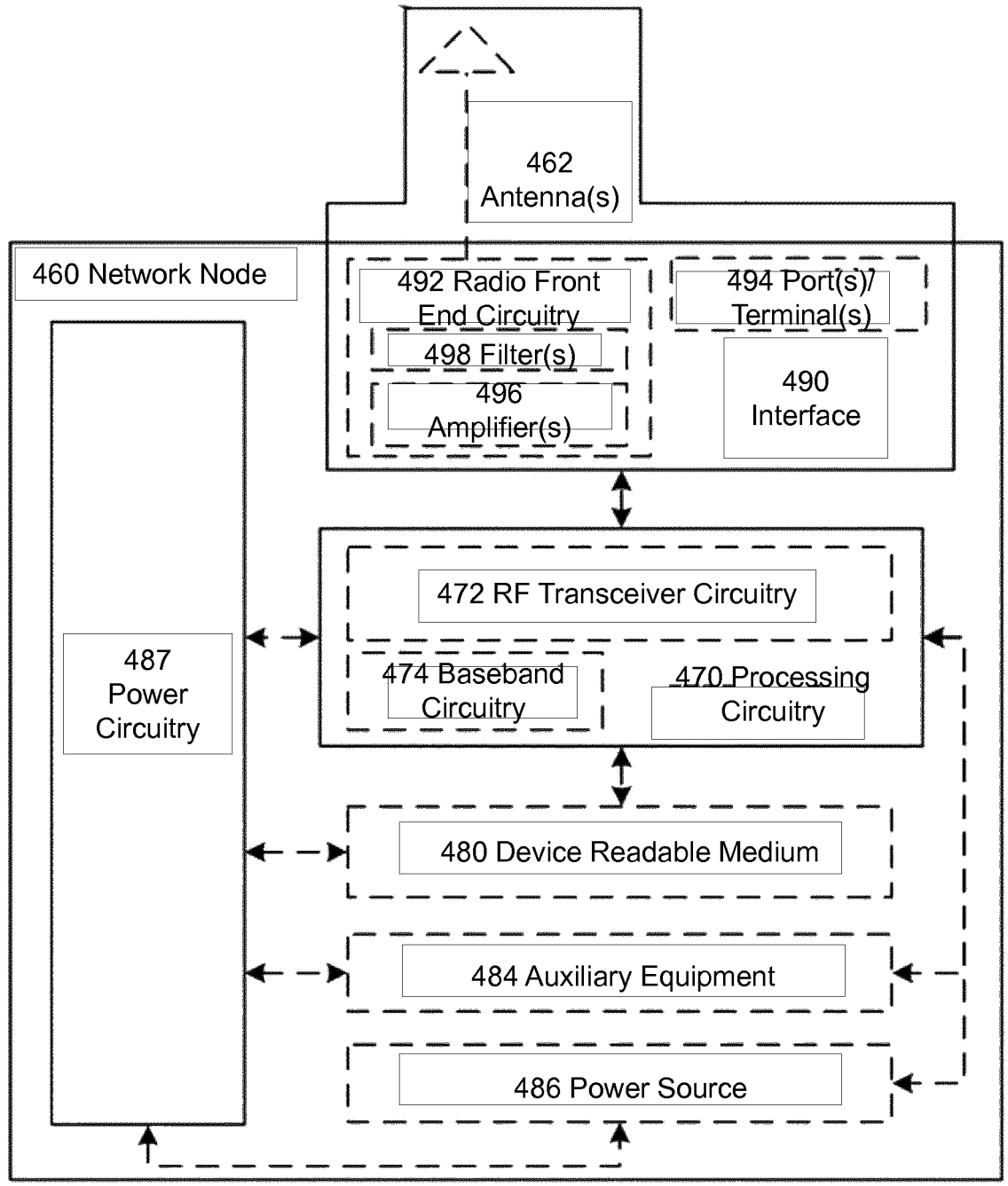
FIG. 10 illustrates an example network node according to certain embodiments.

FIG. 10 illustrates an example network node 460, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 460 includes processing circuitry 470, device readable medium 480, interface 490, auxiliary equipment 484, power source 486, power circuitry 487, and antenna 462. Although network node 460 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units.

In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460 but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signaling and/or data between network node 460, network 406, and/or wireless devices 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or wireless devices via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 10 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

Figure 11:
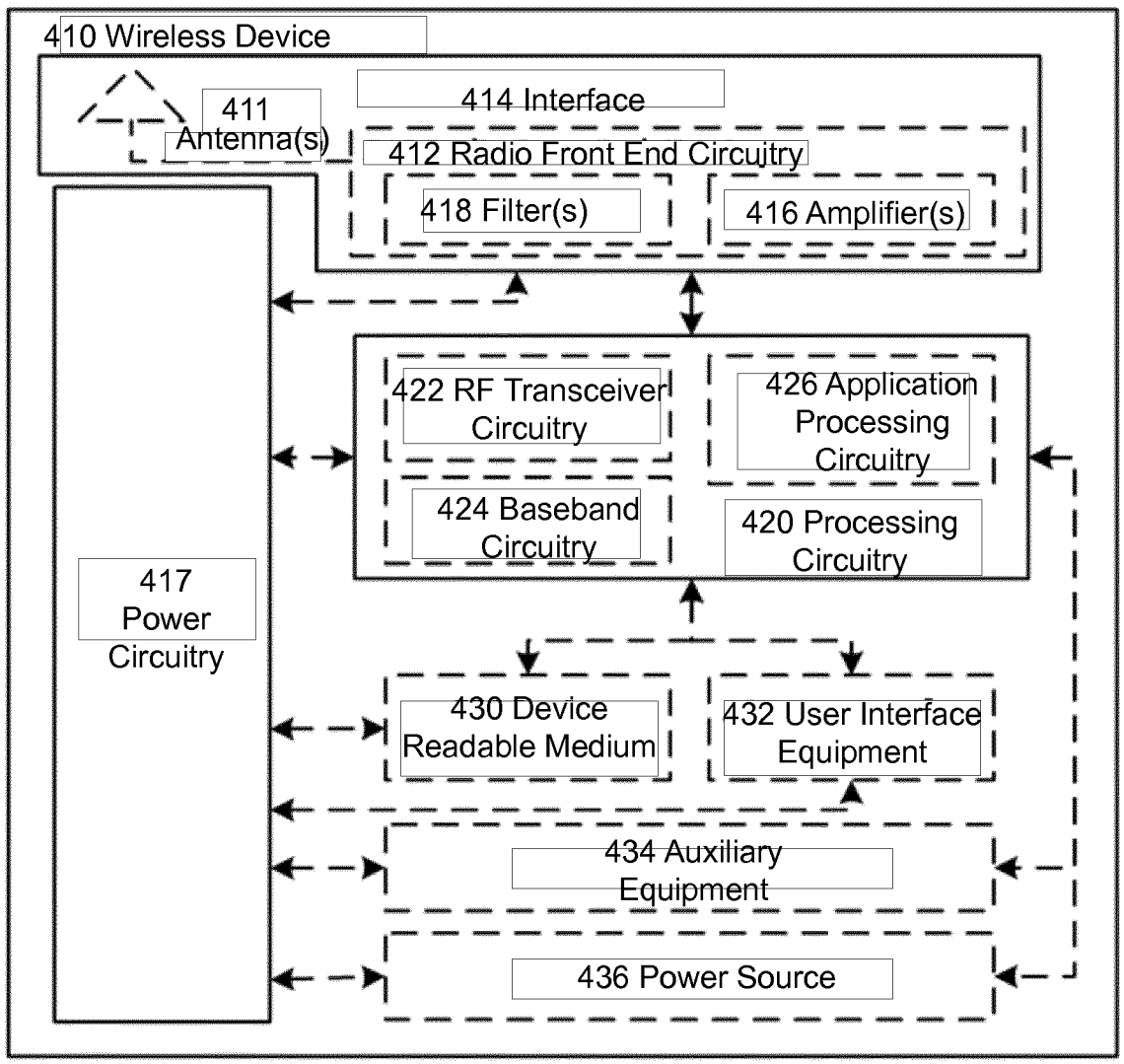
FIG. 11 illustrates an example wireless device according to certain embodiments.

FIG. 11 illustrates an example wireless device, according to certain embodiments. As used herein, wireless device refer to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. wireless device 410 may include multiple sets of one or more of the illustrated components for different wireless technologies supported by wireless device 410, such as, for example, GSM, WCDMA, LTE, NR, WiFi, WiMAX, or Bluetooth wireless technologies, just to mention a few. These wireless technologies may be integrated into the same or different chips or set of chips as other components within wireless device 410.

Antenna 411 may include one or more antennas or antenna arrays, configured to send and/or receive wireless signals, and is connected to interface 414. In certain alternative embodiments, antenna 411 may be separate from wireless device 410 and be connectable to wireless device 410 through an interface or port. Antenna 411, interface 414, and/or processing circuitry 420 may be configured to perform any receiving or transmitting operations described herein as being performed by a wireless device. Any information, data and/or signals may be received from a network node and/or another wireless device. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420 and is configured to condition signals communicated between antenna 411 and processing circuitry 420. Radio front end circuitry 412 may be coupled to or a part of antenna 411. In some embodiments, wireless device 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or wireless devices via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 410 components, such as device readable medium 430, wireless device 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of wireless device 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a wireless device may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of wireless device 410, but are enjoyed by wireless device 410 as a whole, and/or by end users and the wireless network generally.

Processing circuitry 420 may be configured to perform any determining, calculating, or similar operations (e.g., certain obtaining operations) described herein as being performed by a wireless device. These operations, as performed by processing circuitry 420, may include processing information obtained by processing circuitry 420 by, for example, converting the obtained information into other information, comparing the obtained information or converted information to information stored by wireless device 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with wireless device 410. Such interaction may be of many forms, such as visual, audial, tactile, etc. User interface equipment 432 may be operable to produce output to the user and to allow the user to provide input to wireless device 410. The type of interaction may vary depending on the type of user interface equipment 432 installed in wireless device 410. For example, if wireless device 410 is a smart phone, the interaction may be via a touch screen; if wireless device 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into wireless device 410 and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from wireless device 410, and to allow processing circuitry 420 to output information from wireless device 410. User interface equipment 432 may include, for example, a speaker, a display, vibrating circuitry, a USB port, a headphone interface, or other output circuitry. Using one or more input and output interfaces, devices, and circuits, of user interface equipment 432, wireless device 410 may communicate with end users and/or the wireless network and allow them to benefit from the functionality described herein.

Auxiliary equipment 434 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. wireless device 410 may further comprise power circuitry 437 for delivering power from power source 436 to the various parts of wireless device 410 which need power from power source 436 to carry out any functionality described or indicated herein. Power circuitry 437 may in certain embodiments comprise power management circuitry. Power circuitry 437 may additionally or alternatively be operable to receive power from an external power source; in which case wireless device 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of wireless device 410 to which power is supplied.

Figure 12:
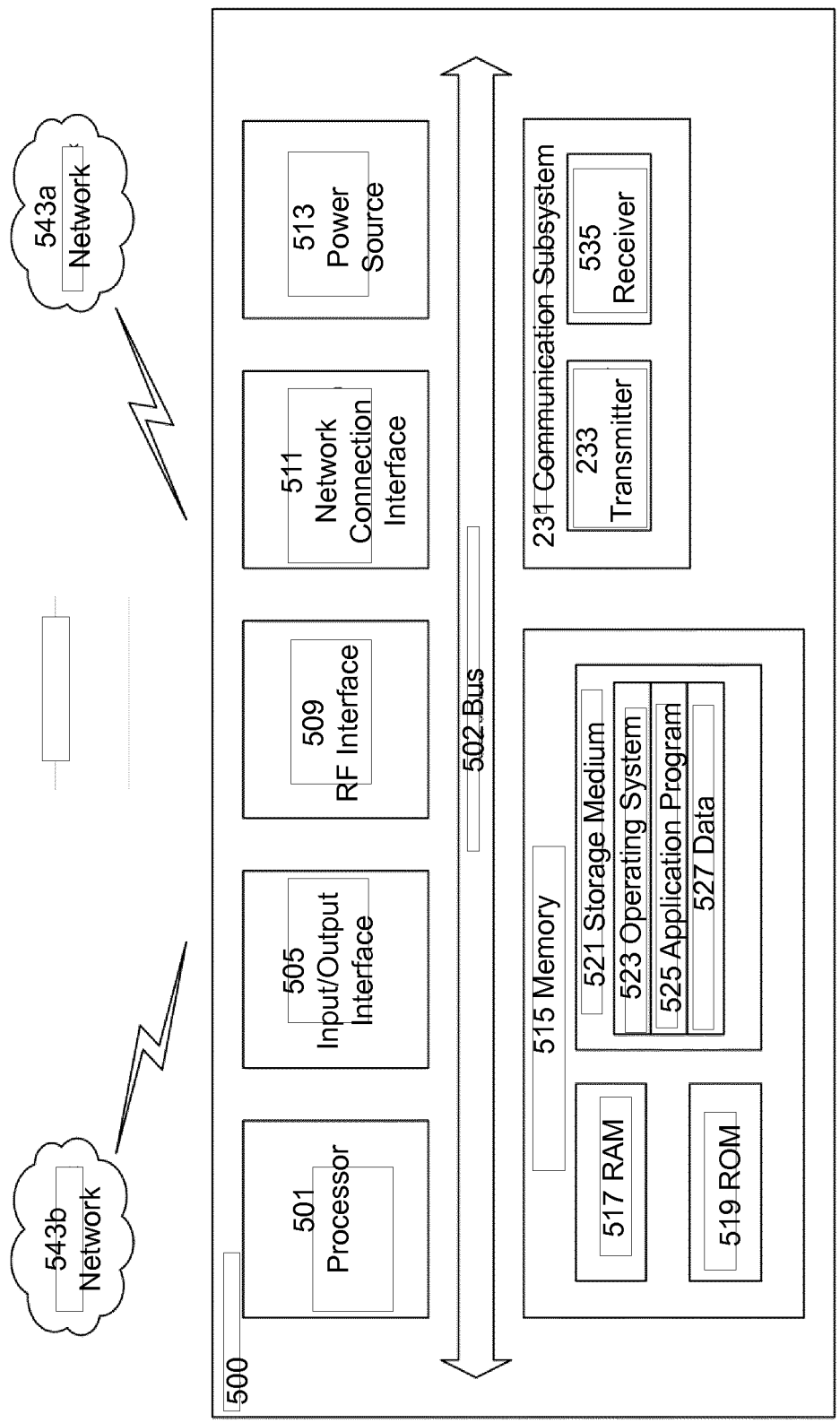
FIG. 12 illustrate an example user equipment for according to certain embodiments.

FIG. 12 illustrates one embodiment of a UE 500 in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 500 may be any UE identified by the 3 rd Generation Partnership Project (3GPP), including a NB-IoT UE, a machine type communication (MTC) UE, and/or an enhanced MTC (eMTC) UE. UE 500, as illustrated in FIG. 12, is one example of a wireless device configured for communication in accordance with one or more communication standards promulgated by the 3 rd Generation Partnership Project (3GPP), such as 3GPP's GSM, UMTS, LTE, and/or 5G standards. As mentioned previously, the term wireless device and UE may be used interchangeable. Accordingly, although FIG. 12 is a UE, the components discussed herein are equally applicable to a wireless device, and vice-versa.

In FIG. 12, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 12, processing circuitry 501 may be configured to communicate with network 543b using communication subsystem 531. Network 543a and network 543b may be the same network or networks or different network or networks. Communication subsystem 531 may be configured to include one or more transceivers used to communicate with network 543b. For example, communication subsystem 531 may be configured to include one or more transceivers used to communicate with one or more remote transceivers of another device capable of wireless communication such as another wireless device, UE, or base station of a radio access network (RAN) according to one or more communication protocols, such as IEEE 802.5, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543b may encompass wired and/or wireless networks such as a local-area network (LAN), a wide-area network (WAN), a computer network, a wireless network, a telecommunications network, another like network or any combination thereof. For example, network 543b may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 13:
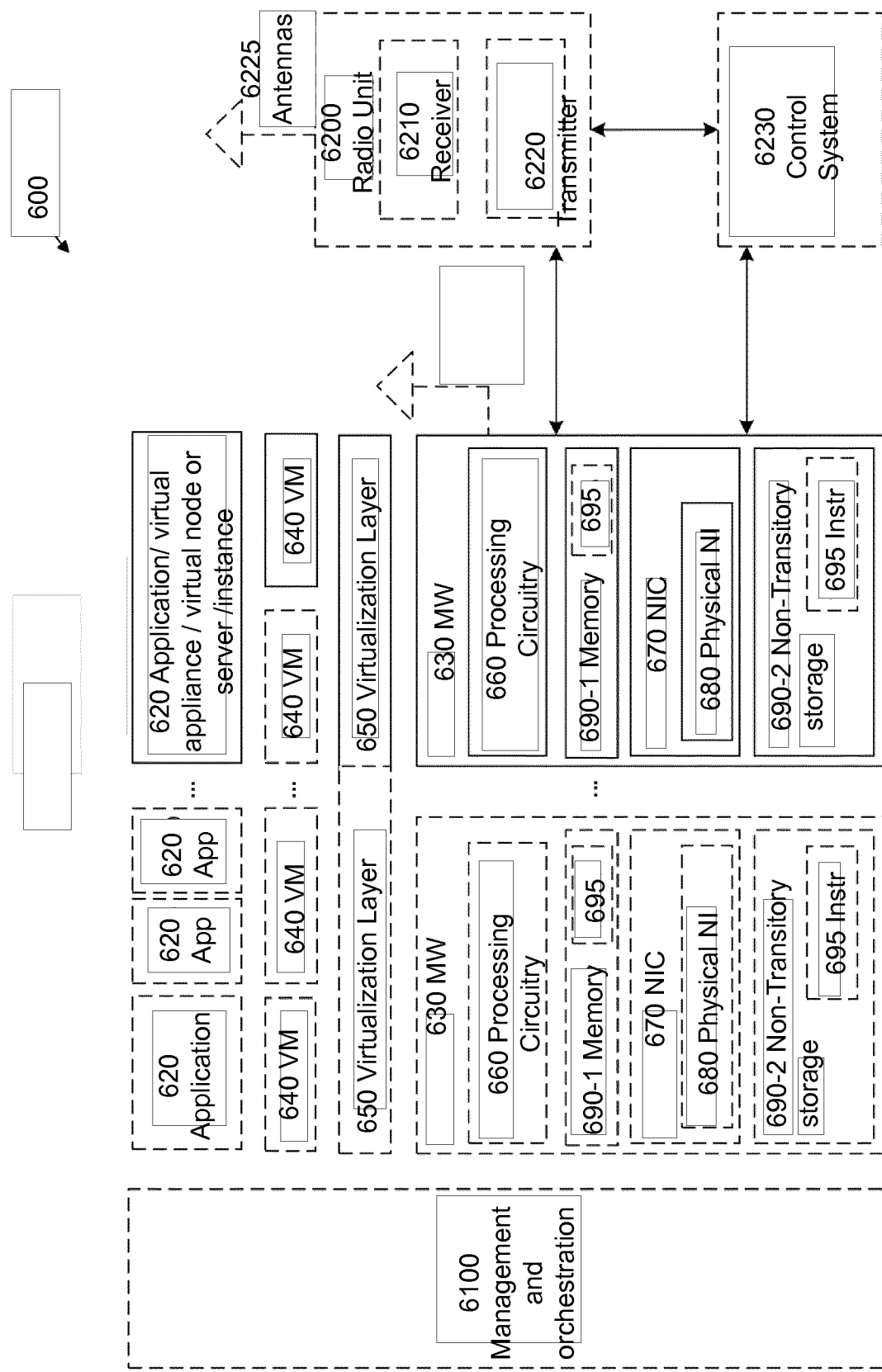
FIG. 13 illustrates a virtualization environment in which functions implemented by some embodiments may be virtualized, according to certain embodiments.

FIG. 13 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 13, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 13.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signaling can be affected with the use of control system 6230 which may alternatively be used for communication between the hardware nodes 630 and radio units 6200.

Figure 14:
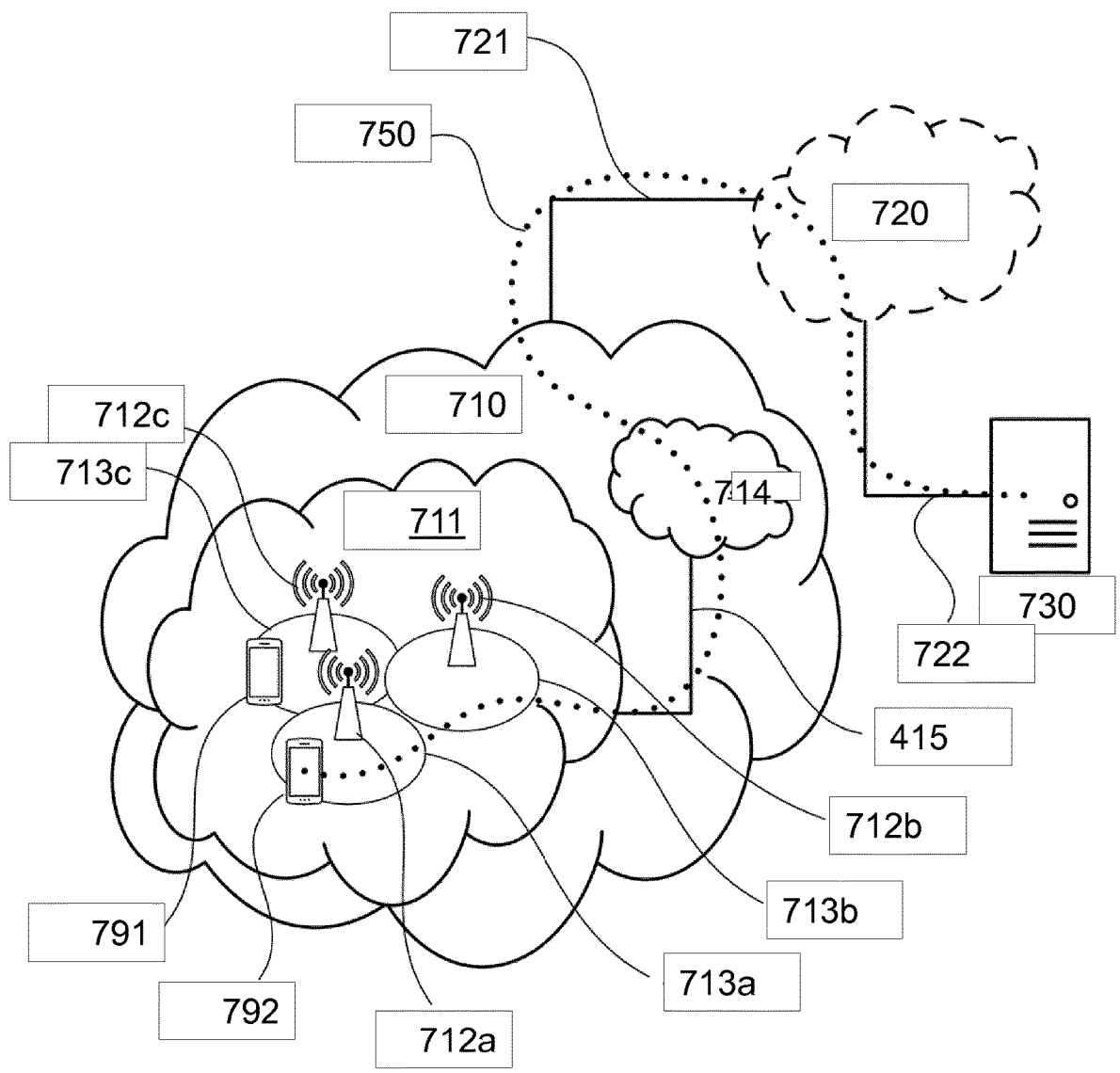
FIG. 14 illustrates a telecommunication network connected via an intermediate network to a host computer, according to certain embodiments.

FIG. 14 illustrates a telecommunication network connected via an intermediate network to a host computer in accordance with some embodiments.

With reference to FIG. 14, in accordance with an embodiment, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more sub-networks (not shown).

The communication system of FIG. 14 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Figure 15:
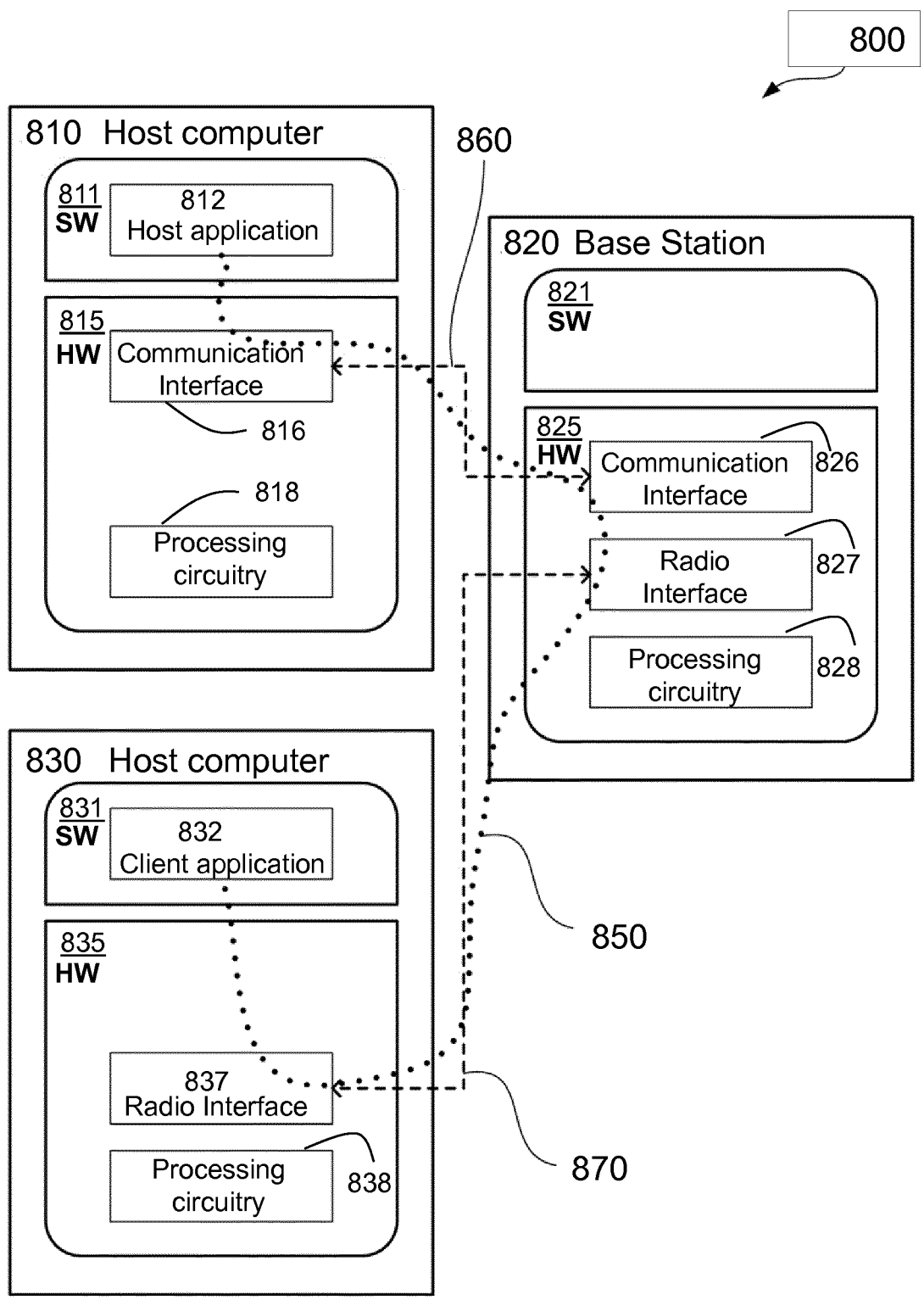
FIG. 15 illustrates a generalized block diagram of a host computer communicating via a base station with a user equipment over a partially wireless connection, according to certain embodiments.

FIG. 15 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 15. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 15 may be similar or identical to host computer 730, one of base stations 712*a*, 712*b*, 712*c* and one of UEs 791, 792 of FIG. 14, respectively. This is to say, the inner workings of these entities may be as shown in FIG. 15 and independently, the surrounding network topology may be that of FIG. 14.

In FIG. 15, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figures 18, 19:
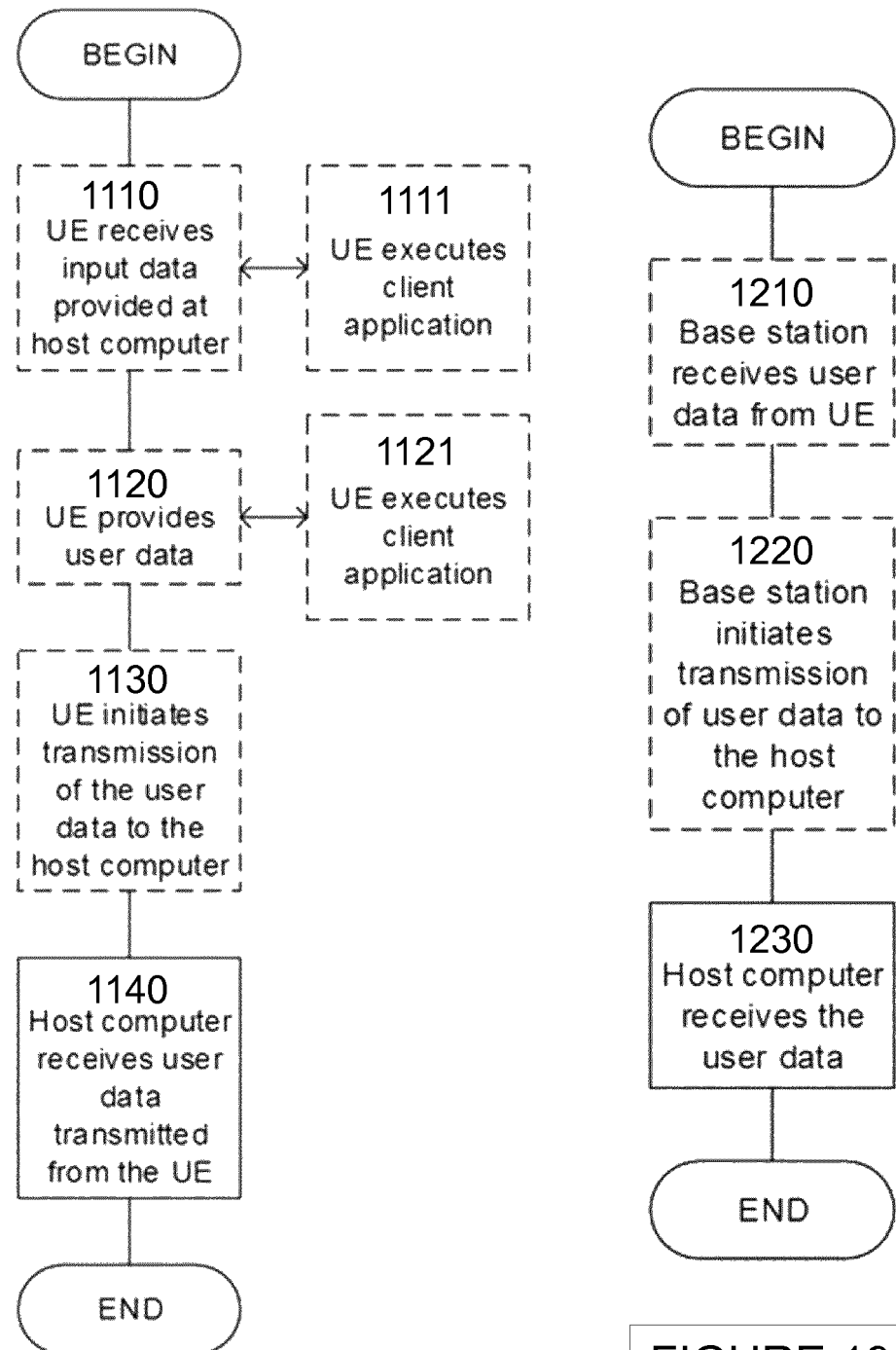
FIG. 18 illustrates another method implemented in a communication system, according to one embodiment.
FIG. 19 illustrates another method implemented in a communication system, according to one embodiment.

FIG. 18 is a flowchart illustrating a method implemented in a communication system, in accordance with one embodiment. The communication system includes a host computer, a base station and a UE which may be those described with reference to FIGS. 14 and 15 For simplicity of the present disclosure, only drawing references to FIG. 18 will be included in this section. In step 1110 (which may be optional), the UE receives input data provided by the host computer. Additionally, or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Figure 20:
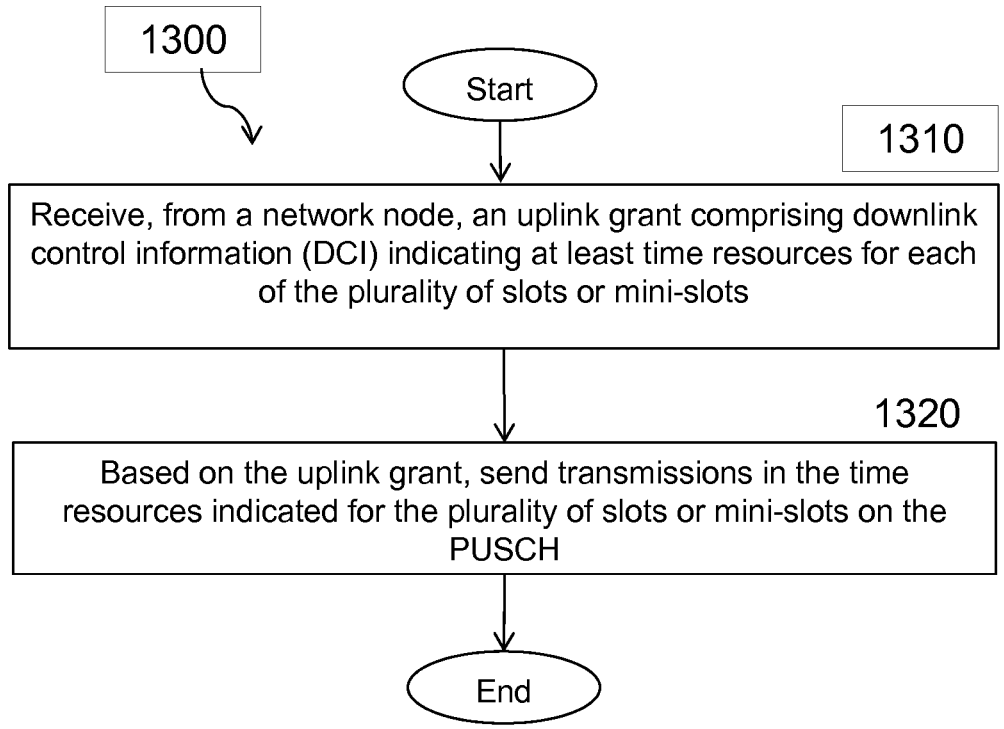
FIG. 20 illustrates an example method by a wireless device according to certain embodiments.

FIG. 20 depicts a method 1300 by a wireless device 410 for receiving scheduling for a plurality of slots or mini-slots for a PUSCH, according to certain embodiments. At step 1310, the wireless device 410 receives, from a network node 460, an uplink grant comprising DCI indicating at least time resources for each of the plurality of slots or mini-slots.

In a particular embodiment, the uplink grant further comprises information associated with at least one of a new data indicator (NDI) per scheduled hybrid automatic repeat request identifier (HARQ ID) and a redundancy version (RV) per scheduled HARQ ID.

In a particular embodiment, the plurality of slots or mini-slots are slots and the DCI indicating the time resources for each of the plurality of slots includes a first field and a second field. The first field includes a time domain resource assignment field, the first field indicating a value, and the second field indicates a number of the plurality of slots that are consecutively scheduled in the uplink grant. The method may further include the wireless device 410 using the value of the first field to identify an indexed row of an allocated radio resource control (RRC) table for PUSCH time allocation. In a particular embodiment, the wireless device 410 may determine, explicitly or implicitly from the allocated RRC table, at least one of the following:

a slot offset,
a start symbol of a first slot of the plurality of slots,
a length of a last slot of the plurality of slots,
an end symbol of a last slot of the plurality of slots, and
a PUSCH mapping type to be applied in the transmissions on the PUSCH.

In another particular embodiment, the plurality of slots or mini-slots are slots and the DCI indicating the time resources for each of the plurality of slots includes a first field. The first field includes a time domain resource assignment field that indicates a value, and the method further includes the wireless device using the value of the first field to identify an indexed row of an allocated radio resource control (RRC) table. The indexed row of the allocated RRC table includes at least a number of the plurality of slots that are consecutively scheduled in the uplink grant. In a particular embodiment, the wireless device 410 may determine, explicitly or implicitly from the allocated RRC table, at least one of the following:

a slot offset,
a start symbol of a first slot of the plurality of slots,
a length of a last slot of the plurality of slots,
an end symbol of a last slot of the plurality of slots, and
a PUSCH mapping type to be applied in the transmissions on the PUSCH.

In yet another particular embodiment, the plurality of slots or mini-slots are slots, and the DCI indicating the time resources for each of the plurality of slots includes a first field and a second field. The first may include a value in a time domain resource assignment field for identifying an indexed row of an allocated radio resource control (RRC) table for PUSCH time allocation, and the second field may indicate a number of the plurality of slots that are consecutively scheduled slots in the uplink grant. The wireless device 410 may use the value of the first field to identify the indexed row of the allocated RRC table, and apply a starting symbol indicated in the indexed row to a first scheduled slot in the plurality of slots. In a particular embodiment, an ending symbol of the first scheduled slot is a thirteenth symbol, a starting symbol of a last scheduled slot is a zero symbol and a PUSCH length is identified in the indexed row of the allocated RRC table, and slots between the first scheduled slot and the last scheduled slot in the plurality of slots start at the zero symbol and end at the thirteenth symbol.

In still another embodiment, the plurality of slots or mini-slots are mini-slots and the wireless device 410 may receive, from a network node, an RRC message comprising at least one RRC pattern, which indicates a start and an end of the plurality of mini-slots. In a particular embodiment, the RRC message includes a plurality of RRC patterns, and the wireless device 410 uses a value indicated in the DCI to identify a particular one of the plurality of RRC patterns for use in sending the transmissions within a mini-slot.

In yet another embodiment, the plurality of slots or mini-slots are mini-slots, and the wireless device 410 receives, from a network node 460, a mini-slot periodicity identifying a number of symbols in each mini-slot.

In still another embodiment, the plurality of slots or mini-slots are mini-slots and the DCI indicates a slot offset and information used to identify a start symbol and a PUSCH length.

In still another embodiment, the plurality of slots or mini-slots are mini-slots, and the DCI indicates a first mini-slot within a slot where a particular transmission should start and second mini-slot within the slot where the particular transmission should end.

In yet another embodiment, the plurality of slots or mini-slots are mini-slots, and the wireless device 410 receives, from a network node 460, an RRC message comprising a plurality of PUSCH starting positions. The DCI includes an indicator that enables or disables a subset of the plurality of PUSCH starting positions such that a particular mini-slot within the plurality of mini-slots begins at a first enabled PUSCH starting position with the subset of PUSCH starting positions and ends at a next enabled PUSCH starting position.

At step 1320, based on the uplink grant, the wireless device 410 sends transmissions in the time resources indicated for the plurality of slots or mini-slots on the PUSCH.

Figure 21:
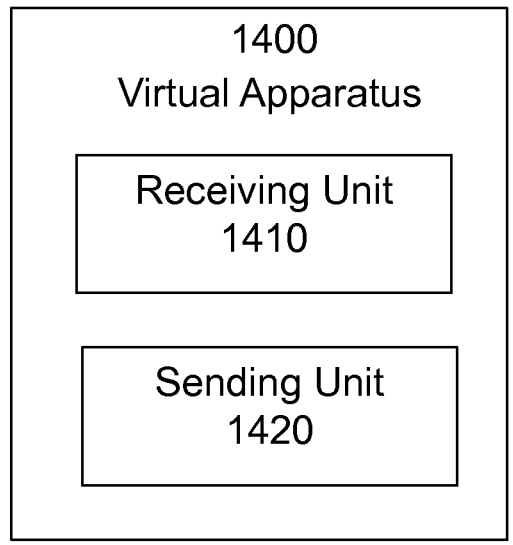
FIG. 21 illustrates an exemplary virtual computing device according to certain embodiments.

FIG. 21 illustrates a schematic block diagram of a virtual apparatus 1400 in a wireless network (for example, the wireless network shown in FIG. 9). The apparatus may be implemented in a wireless device or network node (e.g., wireless device 410 or network node 460 shown in FIG. 9). Apparatus 1400 is operable to carry out the example method described with reference to FIG. 20 and possibly any other processes or methods disclosed herein. It is also to be understood that the method of FIG. 20 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit/module 1410, sending unit/module 1420, and any other suitable units of apparatus 1400 to perform corresponding functions according one or more embodiments of the present disclosure.

According to certain embodiments, receiving unit/module 1410 may perform certain of the receiving functions of the apparatus 1400. For example, receiving unit/module 1410 may receive, from a network node 460, an uplink grant comprising DCI indicating at least time resources for each of the plurality of slots or mini-slots.

According to certain embodiments, sending unit/module 1420 may perform certain of the sending functions of the apparatus 1400. For example, sending unit/module 1420 may send transmissions in the time resources indicated for the plurality of slots or mini-slots on the PUSCH based on the uplink grant.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 22:
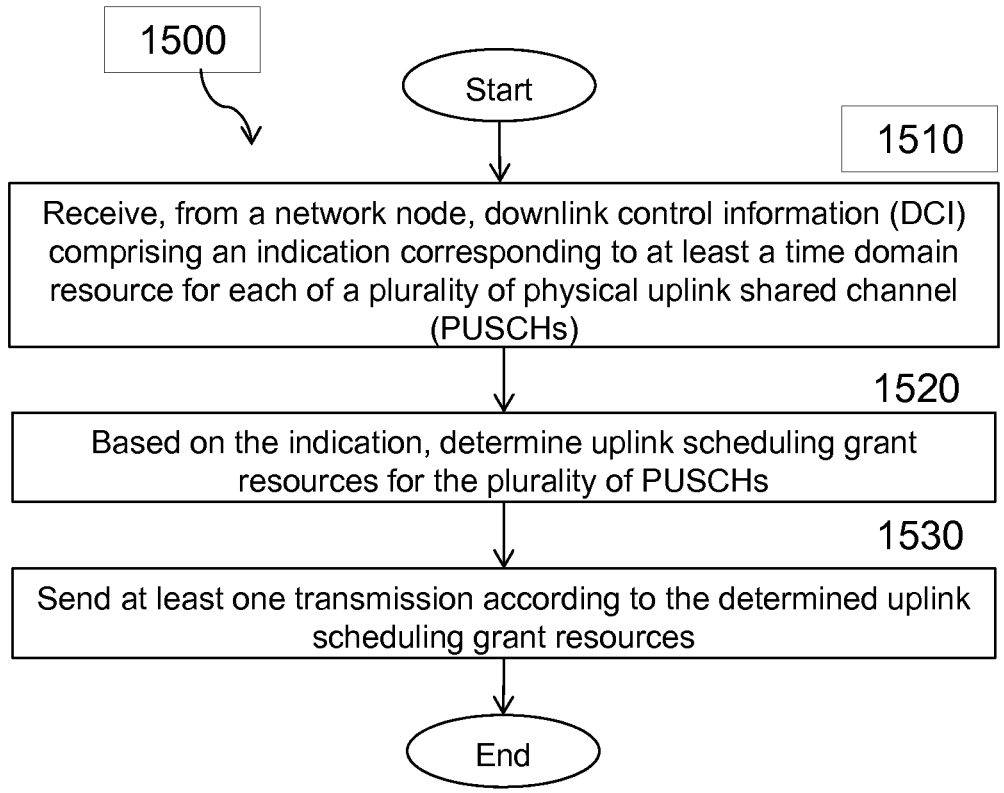
FIG. 22 illustrates another example method by a wireless device according to certain embodiments.

FIG. 22 depicts another method 1500 by a wireless device 410 for receiving an uplink scheduling grant for a plurality of PUSCHs, according to certain embodiments. At step 1510, the wireless device 410 receives DCI from a network node 460. The DCI comprises an indication corresponding to at least a time domain resource for each of the plurality of PUSCHs. Based on the indication, the wireless device 410 determines uplink scheduling grant resources for the plurality of PUSCHs, at step 1520. At step 1530, wireless device 410 sends at least one transmission according to the determined uplink scheduling grant resources.

In a particular embodiment, the DCI indication includes a first field indicating a value in at least one allocated radio resource control, RRC, configured table for PUSCH time resource allocation. In a further particular embodiment, the DCI indication further includes a second field indicating a number of the plurality of PUSCHs that are consecutively scheduled in the uplink grant.

In a particular embodiment, the wireless device 410 may determine, based on the at least one allocated RRC configured table, at least one of: an offset, a start symbol of a first PUSCH of the plurality of PUSCHs, a length of a last PUSCH of the plurality of PUSCHs, an end symbol of a last PUSCH of the plurality of PUSCHs, a number of the plurality of PUSCHs that are consecutively scheduled in the uplink grant, and at least one PUSCH mapping type.

In a particular embodiment, wireless device 410 may use the value of the first field to identify an indexed row of the at least one allocated RRC table and apply a starting symbol indicated in the indexed row to a first scheduled PUSCH in the plurality of PUSCHs. An ending symbol of the first scheduled PUSCH may be indicated by a symbol position, and a starting symbol of a last scheduled PUSCH may be indicated by another symbol position. In a further particular embodiment, the symbol position may be a thirteenth symbol position, and the other symbol position may be a zero symbol position.

In a particular embodiment, the plurality of PUSCHs may include a plurality of full slots.

In another embodiment, the plurality of PUSCHs may include a plurality of partial slots, each partial slot being less than a full slot. In a further particular embodiment, wireless device 410 may receive, from network node 460, a periodicity identifying a number of symbols in each of the plurality of partial slots.

In a particular embodiment, wireless device 410 may receive, from network node 460, an RRC message comprising at least one RRC pattern. The at least one RRC pattern may indicate a start and an end of each of the plurality of partial slots. In a further particular embodiment, the RRC message may include a plurality of RRC patterns, and wireless device 410 may use a value indicated in the DCI to identify a particular one of the plurality of RRC patterns for use in sending the PUSCHs in the plurality of partial slots.

In a particular embodiment, the DCI indicates an offset and information used to identify a start symbol of a first one of the PUSCHs in the at least one RRC pattern.

In a particular embodiment, the DCI indicates a first partial slot where transmission starts and second partial slot where the transmission ends.

In a particular embodiment, wireless device 410 may receive, from network node 460, an RRC message comprising a plurality of PUSCH starting positions. The DCI may include an indicator that enables or disables a subset of the plurality of PUSCH starting positions.

In a particular embodiment, a particular partial slot within the plurality of partial slots begins at a first enabled PUSCH starting position within the subset of the plurality of PUSCH starting positions and ends at a next enabled PUSCH starting position within the subset of the plurality of PUSCH starting positions.

Figure 23:
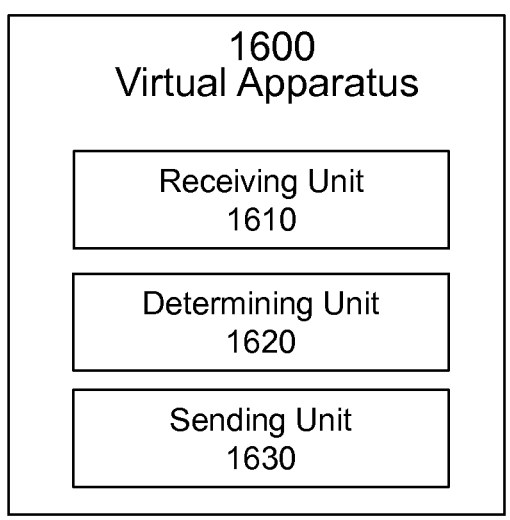
FIG. 23 illustrates another exemplary virtual computing device according to certain embodiments.

FIG. 23 illustrates a schematic block diagram of a virtual apparatus 1600 in a wireless network (for example, the wireless network shown in FIG. 9). The apparatus may be implemented in a wireless device or network node (e.g., wireless device 410 or network node 460 shown in FIG. 9). Apparatus 1600 is operable to carry out the example method described with reference to FIG. 22 and possibly any other processes or methods disclosed herein. It is also to be understood that the method of FIG. 22 is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1610, determining unit 1620, sending unit 1630, and any other suitable units of apparatus 1600 to perform corresponding functions according one or more embodiments of the present disclosure.

According to certain embodiments, receiving unit 1610 may perform certain of the receiving functions of the apparatus 1600. For example, receiving unit 1610 may receive DCI from a network node 460. The DCI includes an indication corresponding to at least a time domain resource for each of the plurality of PUSCHs.

According to certain embodiments, determining unit 1620 may perform certain of the determining functions of the apparatus 1600. For example, determining unit 1620 may determine uplink scheduling grant resources for the plurality of PUSCHs based on the indication.

According to certain embodiments, sending unit 1630 may perform certain of the sending functions of the apparatus 1600. For example, sending unit 1620 may send at least one transmission according to the determined uplink scheduling grant resources.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 24:
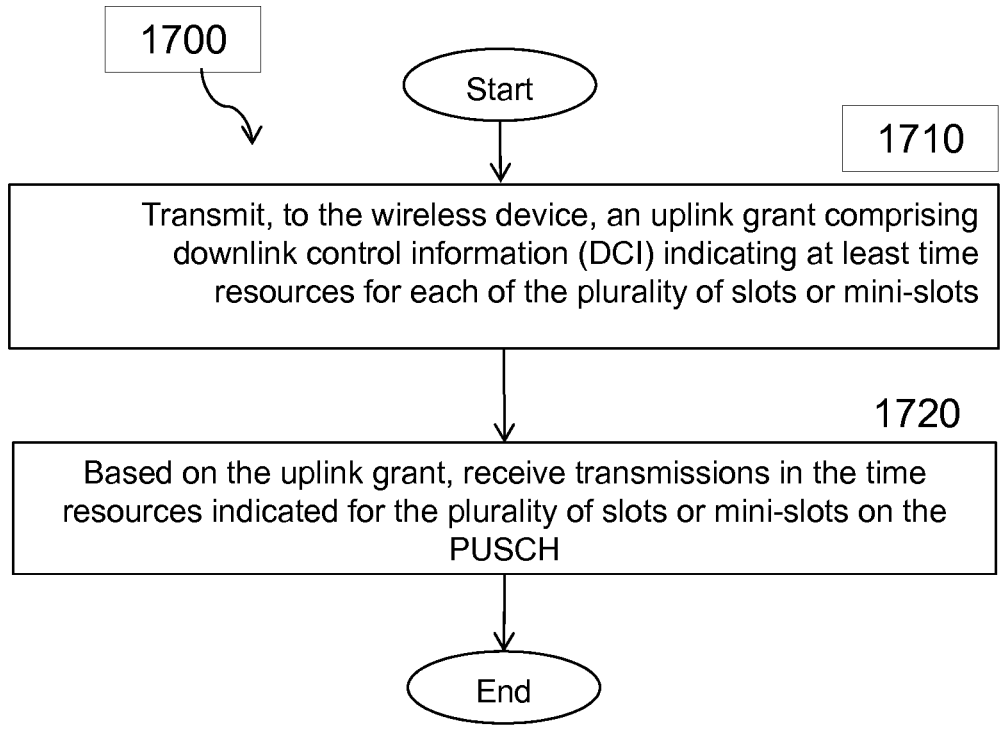
FIG. 24 illustrates an example method by a network node according to certain embodiments.

FIG. 24 depicts a method 1700 by a network node 460 for scheduling a wireless device 410 for transmission in a plurality of slots or mini-slots for PUSCH, according to certain embodiments. At step 1710, the network node 460 transmits, to the wireless device 410, an uplink grant comprising downlink control information (DCI) indicating at least time resources for each of the plurality of slots or mini-slots.

In a particular embodiment, the uplink grant further includes information associated with at least one of an NDI) per scheduled HARQ ID and an RV per scheduled HARQ ID.

In a particular embodiment, the plurality of slots or mini-slots are slots, and the DCI indicating the time resources for each of the plurality of slots includes a first field and a second field. The first field includes a time domain resource assignment field, the first field indicating a value for use by the wireless device 410 in identifying an indexed row of an allocated RRC table for PUSCH time allocation. The second field indicates a number of the plurality of slots that are consecutively scheduled in the uplink grant. In a particular embodiment, the indexed row of the allocated RRC table indicates implicitly or explicitly at least one of:
 a slot offset,
 a start symbol of a first slot of the plurality of slots,
 a length of the last slot of the plurality of slots,
 an end symbol of a last slot of the plurality of slots, and
 a PUSCH mapping type to be applied in the transmissions on the PUSCH.

In another embodiment, the plurality of slots or mini-slots are slots, and the network node 460 transmits, to the wireless device, an allocated RRC table for PUSCH time allocation, The DCI indicates the time resources for each of the plurality of slots comprises a first field comprises a time domain resource assignment field, which indicates a value for use by the wireless device in identifying an indexed row of the allocated RRC table. The indexed row of the allocated RRC table includes at least a number of the plurality of slots that are consecutively scheduled in the uplink grant. In a particular embodiment, the indexed row of the allocated RRC table indicates implicitly or explicitly at least one of:
 a slot offset,
 a start symbol of a first slot of the plurality of slots,
 a length of the last slot of the plurality of slots,
 an end symbol of a last slot of the plurality of slots, and
 a PUSCH mapping type to be applied in the transmissions on the PUSCH, In another embodiment, the plurality of slots or mini-slots are slots, and the DCI indicating the time resources for each of the plurality of slots includes a first field and a second field. The first field includes a value in a time domain resource assignment field for identifying an indexed row of an allocated RRC table for PUSCH time allocation. The second field indicates a number of the plurality of slots that are consecutively scheduled in the uplink grant. The network node 460 may configure the wireless device 410 to use the value of the first field to identify the indexed row of the allocated RRC table for PUSCH time allocation and apply a starting symbol indicated in the indexed row to a first scheduled slot in the plurality of slots such that an ending symbol of the first scheduled slot is a thirteenth symbol, a starting symbol of a last scheduled slot is a zero symbol and a PUSCH length is identified in the indexed row of the allocated RRC table, and slots between the first scheduled slot and the last scheduled slot in the plurality of slots start at the zero symbol and end at the thirteenth symbol.

In another embodiment, the plurality of slots or mini-slots are mini-slots, and the network node may transmit, to the wireless device, an RRC message comprising at least one RRC pattern, which indicates a start and an end of the plurality of mini-slots. In a particular embodiment, the RRC message includes a plurality of RRC patterns, and the network node 460 configures the wireless device 410 to use a value indicated in the DCI to identify a particular one of the plurality of RRC patterns for use in sending the transmissions within a mini-slot.

In another embodiment, the plurality of slots or mini-slots are mini-slots, and the network node 460 transmits, to the wireless device 410, a mini-slot periodicity identifying a number of symbols in each mini-slot.

In still another embodiment, the plurality of slots are mini-slots, and the DCI indicates a slot offset and information used to identify a start symbol and a PUSCH length.

In yet another embodiment, the plurality of slots or mini-slots are mini-slots, and the DCI indicates a first mini-slot within a slot where a particular transmission should start and second mini-slot within the slot where the particular transmission should end.

In still another embodiment, the plurality of slots or mini-slots are mini-slots and the method further includes transmitting, to the wireless device 410, an RRC message comprising a plurality of PUSCH starting positions, and the DCI comprises an indicator that enables or disables a subset of the plurality of PUSCH starting position such that a particular mini-slot within the plurality of mini-slots begins at a first enabled PUSCH starting position with the subset of PUSCH starting positions and ends at a next enabled PUSCH starting position.

Figure 25:
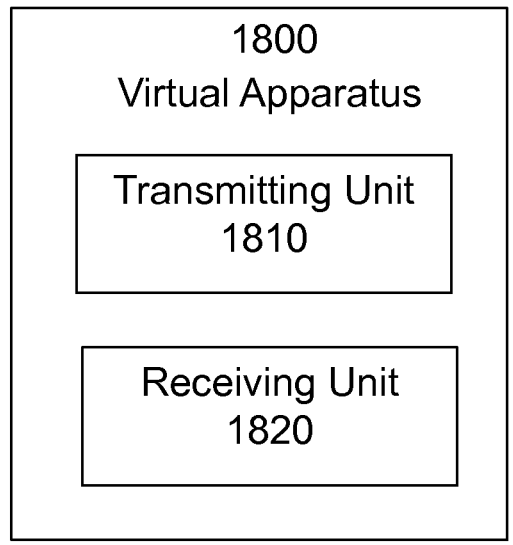
FIG. 25 illustrates another exemplary virtual computing device according to certain embodiments.

At step 1720, the network node 460 receives, based on the uplink grant, transmissions in the time resources indicated for the plurality of slots or mini-slots on the PUSCH. FIG. 25 illustrates a schematic block diagram of a virtual apparatus 1800 in a wireless network (for example, the wireless network shown in FIG. 9). The apparatus may be implemented in a wireless device or network node (e.g., wireless device 410 or network node 460 shown in FIG. 9). Apparatus 1800 is operable to carry out the example method described with reference to FIG. 24 and possibly any other processes or methods disclosed herein. It is also to be understood that the method of FIG. 24 is not necessarily carried out solely by apparatus 1800. At least some operations of the method can be performed by one or more other entities. Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit/module 1810, receiving unit/module 1820, and any other suitable units of apparatus 1800 to perform corresponding functions according one or more embodiments of the present disclosure.

According to certain embodiments, transmitting unit/module 1810 may perform certain of the transmitting functions of the apparatus 1800. For example, transmitting unit/module 1810 may transmit, to the wireless device 410, an uplink grant comprising DCI indicating at least time resources for each of the plurality of slots or mini-slots.

According to certain embodiments, receiving unit/module 1820 may perform certain of the receiving functions of the apparatus 1800. For example, receiving unit/module 1820 may receive transmissions in the time resources indicated for the plurality of slots or mini-slots on the PUSCH based on the uplink grant.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 26:
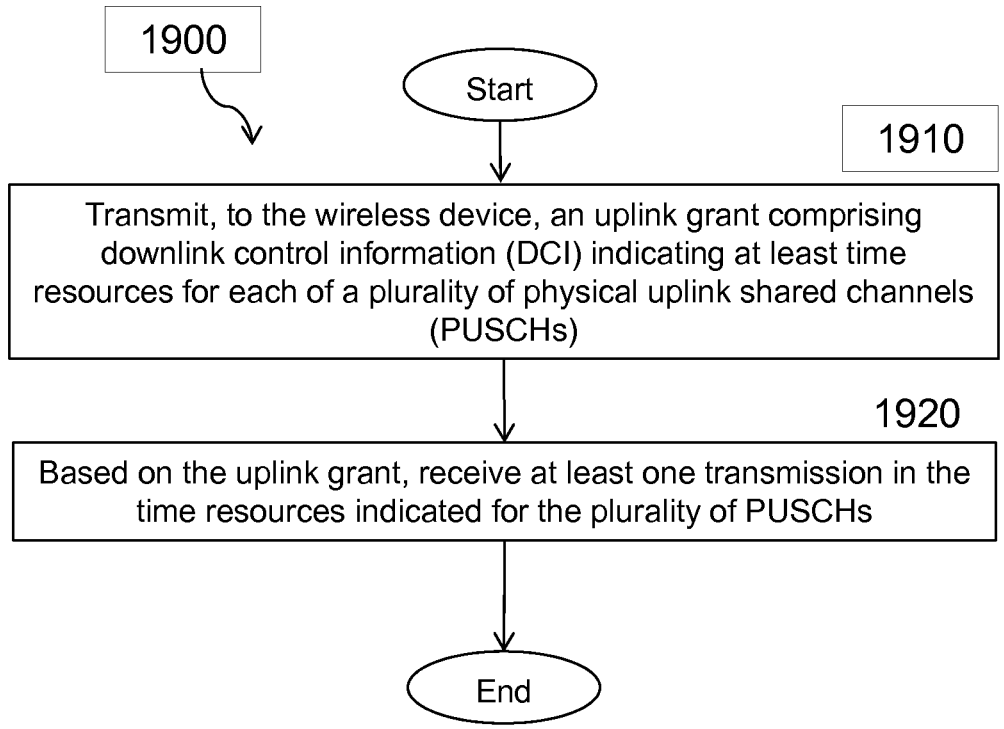
FIG. 26 illustrates another example method by a network node according to certain embodiments.

FIG. 26 depicts a method 1900 by a network node 460 for scheduling a wireless device 410 for transmission in a plurality of PUSCHs, according to certain embodiments. At step 1910, the network node 460 transmits, to the wireless device 410, an uplink grant comprising DCI indicating at least time resources for each of the plurality of PUSCHs. At step 1920, based on the uplink grant, the network node 460 receives at least one transmission in the time resources indicated for the plurality of PUSCHs.

In a particular embodiment, the DCI includes a first field indicating a value in at least one allocated radio resource control, RRC, configured table for PUSCH time resource allocation. In a further particular embodiment, the DCI further includes a second field indicating a number of the plurality of PUSCHs that are consecutively scheduled in the uplink grant.

In a particular embodiment, network node 460 transmits, to the wireless device 410, the at least one allocated RRC table. The at least one allocated RRC table includes: at least one of an offset, a start symbol of a first PUSCH of the plurality of PUSCHs, a length of a last PUSCH of the plurality of PUSCHs, an end symbol of a last PUSCH of the plurality of PUSCHs, a number of the plurality of PUSCHs that are consecutively scheduled in the uplink grant, and at least one PUSCH mapping type.

In a particular embodiment, the value of the first field identifies an indexed row of the at least one allocated RRC table. A starting symbol indicated in the indexed row is applied to a first scheduled PUSCH in the plurality of PUSCHs. An ending symbol of the first scheduled PUSCH is indicated by a symbol position, and a starting symbol of a last scheduled PUSCH is indicated by another symbol position. In a further particular embodiment, the symbol position is a thirteenth symbol position, and the other symbol position is a zero symbol position.

In a particular embodiment, the plurality of PUSCHs include a plurality of full slots.

In another particular embodiment, the plurality of PUSCHs include a plurality of partial slots that are each less than a full slot.

In a particular embodiment, network node 460 transmits, to the wireless device 410, a periodicity identifying a number of symbols in each of the plurality of partial slots.

In a particular embodiment, network node 460 transmits, to the wireless device 410, an RRC message comprising at least one RRC pattern. The at least one RRC pattern indicates a start and an end of each of the plurality of partial slots.

In a further particular embodiment, the RRC message comprises a plurality of RRC patterns, and a value indicated in the DCI identifies a particular one of the plurality of RRC patterns for sending the PUSCHs in the plurality of partial slots.

In a further particular embodiment, the DCI indicates an offset and information used to identify a start symbol of a first one of the PUSCHs in the at least one RRC pattern.

In a further particular embodiment, the DCI indicates a first partial slot where transmission starts and second partial slot where the transmission ends.

In a further particular embodiment, network node 460 transmits, to the wireless device 410, an RRC message comprising a plurality of PUSCH starting positions, and the DCI includes an indicator that enables or disables a subset of the plurality of PUSCH starting positions.

In a further particular embodiment, a particular partial slot within the plurality of partial slots begins at a first enabled PUSCH starting position within the subset of the plurality of PUSCH starting positions and ends at a next enabled PUSCH starting position within the subset of the plurality of PUSCH starting positions.

Figure 27:
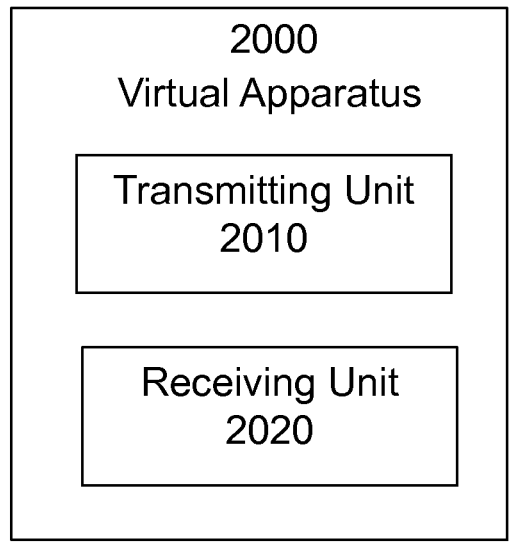
FIG. 27 illustrates another exemplary virtual computing device according to certain embodiments.

FIG. 27 illustrates a schematic block diagram of a virtual apparatus 2000 in a wireless network (for example, the wireless network shown in FIG. 9). The apparatus may be implemented in a wireless device or network node (e.g., wireless device 410 or network node 460 shown in FIG. 9). Apparatus 2000 is operable to carry out the example method described with reference to FIG. 26 and possibly any other processes or methods disclosed herein. It is also to be understood that the method of FIG. 26 is not necessarily carried out solely by apparatus 2000. At least some operations of the method can be performed by one or more other entities. Virtual Apparatus 2000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 2010, receiving unit 2020, and any other suitable units of apparatus 2000 to perform corresponding functions according one or more embodiments of the present disclosure.

According to certain embodiments, transmitting unit 2010 may perform certain of the transmitting functions of the apparatus 2000. For example, transmitting unit 2010 may transmit, to the wireless device 410, an uplink grant comprising DCI indicating at least time resources for each of the plurality of PUSCHs.

According to certain embodiments, receiving unit 2020 may perform certain of the receiving functions of the apparatus 2000. For example, receiving unit 2020 may receive, based on the uplink grant, at least one transmission in the time resources indicated for the plurality of PUSCHs.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
5GS 5G System
5QI 5G QoS Identifier
ARQ Automatic Repeat Request
ACK/NACK Acknowledgment/Not-acknowledgment
COT Channel occupancy time
DCI Downlink Control Information
DFTS-OFDM Discrete Fourier Transform Spread OFDM
DL Downlink
DM-RS Demodulation Reference Signal
eNB E-UTRAN NodeB
ePDCCH enhanced Physical Downlink Control Channel
EPS Evolved Packet System
E-UTRA Evolved UTRA
E-UTRAN Evolved Universal Terrestrial Radio Access Network
gNB gNode B (a base station in NR; a Node B supporting NR and connectivity to NGC)
GNSS Global Navigation Satellite System
GSM Global System for Mobile communication
HARQ Hybrid Automatic Repeat Request
LTE Long-Term Evolution
LBT Listen before talk
MAC Medium Access Control
MBMS Multimedia Broadcast Multicast Services
MBSFN Multimedia Broadcast multicast service Single Frequency Network
MME Mobility Management Entity
MSC Mobile Switching Center
NGC Next Generation Core
NR New Radio
OFDM Orthogonal Frequency Division Multiplexing
OFDMA Orthogonal Frequency Division Multiple Access
OTDOA Observed Time Difference of Arrival
O&M Operation and Maintenance
PBCH Physical Broadcast Channel
P-CCPCH Primary Common Control Physical Channel
PCFICH Physical Control Format Indicator Channel
PDCCH Physical Downlink Control Channel
PDSCH Physical Downlink Shared Channel
PHICH Physical Hybrid-ARQ Indicator Channel
PLMN Public Land Mobile Network
PRS Paging reference symbol
PS Packet Switched
PUCCH Physical Uplink Control Channel
PUSCH Physical Uplink Shared Channel
RACH Random Access Channel
QAM Quadrature Amplitude Modulation
RAB Radio Access Bearer
RAN Radio Access Network
RANAP Radio Access Network Application Part
RAT Radio Access Technology
RLM Radio Link Management
RNC Radio Network Controller
RNTI Radio Network Temporary Identifier
RRC Radio Resource Control
RRM Radio Resource Management
RS Reference Signal
SCH Synchronization Channel
SCell Secondary Cell
SCS Subcarrier Spacing
SGW Serving Gateway
SI System Information
SIB System Information Block
SS Synchronization Signal
SSS Secondary Synchronization Signal
TBS Transport Block Size
TDD Time Division Duplex
TRS Tracking reference symbol
TTI Transmission Time Interval
UE User Equipment
UL Uplink
UMTS Universal Mobile Telecommunication System
USIM Universal Subscriber Identity Module
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for receiving an uplink scheduling grant for a plurality of physical uplink shared channels (PUSCHS), the method comprising:
    receiving, from a network node, a Radio Resource Control (RRC) message comprising a plurality of RRC patterns for use in sending the PUSCHs, each RRC pattern indicating a start and an end of each of the plurality of PUSCHs;

receiving, from the network node, downlink control information (DCI), the DCI comprising an indication corresponding to an RRC pattern to be used for uplink transmission;

based on the indication, determining uplink scheduling grant resources for the plurality of PUSCHs; and sending at least one uplink transmission according to the determined uplink scheduling grant resources.

2. The method of claim 1, wherein the plurality of PUSCHs comprise a plurality of partial slots or mini-slots, each partial slot or mini-slot being less than a full slot.

3. The method of claim 2, further comprising:

receiving, from a network node, a periodicity identifying a number of symbols in each of the plurality of partial slots or mini-slots.

4. The method of claim 2, wherein a particular partial slot within the plurality of partial slots begins at a first enabled PUSCH starting position within the subset of the plurality of PUSCH starting positions and ends at a next enabled PUSCH starting position within the subset of the plurality of PUSCH starting positions.

5. The method of claim 2, wherein the DCI indicates implicitly at which mini-slot within the RRC pattern the uplink transmission should start and end.

6. A wireless device for receiving scheduling for a plurality of physical uplink shared channels (PUSCHs), the wireless device comprising:

memory operable to store instructions; and processing circuitry operable to execute the instructions to cause the wireless device to:

receive, from a network node, a Radio Resource Control (RRC) message comprising a plurality of RRC patterns for use in sending the PUSCHs, each RRC pattern indicating a start and an end of each of the plurality of PUSCHs;

receive, from the network node, downlink control information (DCI), the DCI comprising an indication corresponding to an RRC pattern to be used for uplink transmission;

based on the indication, determine uplink scheduling grant resources for the plurality of PUSCHs; and send at least one uplink transmission according to the determined uplink scheduling grant resources.

7. A method performed by a network node for scheduling a wireless device for transmission in a plurality of physical uplink shared channels (PUSCHs), the method comprising:

transmitting, to the wireless device, a Radio Resource Control (RRC) message comprising a plurality of RRC patterns for use in sending the PUSCHs, each RRC pattern indicating a start and an end of each of the plurality of PUSCHs;

transmitting, to the wireless device, an uplink grant comprising downlink control information (DCI) indicating the pattern to be used by the wireless device for uplink transmissions based on the uplink grant, receiving at least one uplink transmission for the plurality of PUSCHs.

8. The method of claim 7, wherein the plurality of PUSCHs comprise a plurality of partial slots or mini-slots, each partial slot or mini-slot being less than a full slot.

9. The method of claim 8, further comprising:

transmitting, to the wireless device, a periodicity identifying a number of symbols in each of the plurality of partial slots.

10. The method of claim 8, wherein the DCI indicates implicitly at which mini-slot within the RRC pattern the uplink transmission should start and end.

11. A network node for scheduling a wireless device for transmission in a plurality of physical uplink shared channels (PUSCHs), the network node comprising:

memory operable to store instructions; and processing circuitry operable to execute the instructions to cause the network node to:

transmit, to the wireless device, a Radio Resource Control (RRC) message comprising a plurality of RRC patterns for use in sending the PUSCHs, each RRC pattern indicating a start and an end of the plurality of PUSCHs;

transmit, to the wireless device, an uplink grant comprising downlink control information (DCI) indicating an RRC pattern to be used by the wireless device for uplink transmissions;

based on the uplink grant, receive at least one uplink transmission for the plurality of PUSCHs.

\* \* \* \* \*

UNITED STATES PATENT AND TRADEMARK OFFICE
CERTIFICATE OF CORRECTION

| | | |
|---|---|---|
| PATENT NO. | : 12,022,462 B2 | Page 1 of 1 |
| APPLICATION NO. | : 17/267278 | |
| DATED | : June 25, 2024 | |
| INVENTOR(S) | : Karaki et al. | |

It is certified that error appears in the above-identified patent and that said Letters Patent is hereby corrected as shown below:

In the Specification

In Column 7, Lines 10-11, delete "
| 3 | Type A | | 0 | 10 |
| 4 | Type B | | 2 | 10 |
" and insert --
| 3 | Type A | j | 0 | 10 |
| 4 | Type B | j | 2 | 10 |
--, therefor.

In Column 7, Line 14, delete "i" and insert -- j --, therefor.

Signed and Sealed this
Thirtieth Day of December, 2025

John A. Squires
*Director of the United States Patent and Trademark Office*